(12) United States Patent
Chen et al.

(10) Patent No.: US 8,861,893 B2
(45) Date of Patent: Oct. 14, 2014

(54) ENHANCING VIDEO USING SUPER-RESOLUTION

(75) Inventors: Yang Chen, Westlake Village, CA (US); David R. Gerwe, West Hills, CA (US); Deying Zhang, Oak Park, CA (US)

(73) Assignee: The Boeing Company, Chicago, IL (US)

( * ) Notice: Subject to any disclaimer, the term of this patent is extended or adjusted under 35 U.S.C. 154(b) by 377 days.

(21) Appl. No.: 13/246,253

(22) Filed: Sep. 27, 2011

(65) Prior Publication Data

US 2013/0077821 A1 Mar. 28, 2013

(51) Int. Cl.
*G06K 9/32* (2006.01)
*G06K 9/36* (2006.01)
*H04N 7/14* (2006.01)
*G06T 3/40* (2006.01)

(52) U.S. Cl.
CPC ..... *G06T 3/4053* (2013.01); *G06T 2207/10016* (2013.01)
USPC ......... 382/299; 382/294; 382/284; 348/14.02

(58) Field of Classification Search
CPC .................................................. G06T 3/4076
See application file for complete search history.

(56) References Cited

U.S. PATENT DOCUMENTS

| | | | |
|---|---|---|---|
| 5,046,147 A * | 9/1991 | Funahashi et al. | 250/587 |
| 6,115,049 A * | 9/2000 | Winner et al. | 345/611 |
| 6,211,913 B1 * | 4/2001 | Hansen et al. | 348/239 |
| 7,463,753 B2 * | 12/2008 | Williams et al. | 382/103 |
| 7,672,540 B2 * | 3/2010 | Sun et al. | 382/294 |
| 7,881,495 B2 * | 2/2011 | Williams et al. | 382/103 |
| 8,031,906 B2 * | 10/2011 | Fujimura et al. | 382/103 |
| 8,199,220 B2 * | 6/2012 | Srikanth et al. | 348/231.99 |
| 8,520,736 B2 * | 8/2013 | Topiwala | 375/240.16 |
| 8,630,454 B1 * | 1/2014 | Wang et al. | 382/103 |
| 2003/0198399 A1 * | 10/2003 | Atkins | 382/261 |
| 2007/0250260 A1 * | 10/2007 | Ariyur et al. | 701/207 |
| 2010/0014709 A1 * | 1/2010 | Wheeler et al. | 382/103 |

(Continued)

FOREIGN PATENT DOCUMENTS

EP 2081150 A1 7/2009

OTHER PUBLICATIONS

Hardie, "High-resolution image reconstruction from a sequence of rotated and translated frames and its application to an infrared imaging system," Society of Proto-Optical Instrumentation Engineers, Opt. Eng, vol. 37, Issue 1, Jan. 1998, pp. 247-260.

(Continued)

*Primary Examiner* — Michelle Entezari
(74) *Attorney, Agent, or Firm* — Yee & Associates, P.C.

(57) ABSTRACT

A method and apparatus for processing images. A portion of a selected image in which a moving object is present is identified. The selected image is one of a sequence of images. Pixels in a region of interest are identified in the selected image. First values are identified for a first portion of the pixels using the images and first transformations. The first portion of the pixels corresponds to the background in the selected image. A first transformation is configured to align features of the background between one image in the images and the selected image. Second values are identified for a second portion of the pixels using the images and second transformations. The second portion of the pixels corresponds to the moving object in the selected image. A second transformation is configured to align features of the moving object between one image in the images and the selected image.

19 Claims, 11 Drawing Sheets

(56) References Cited

U.S. PATENT DOCUMENTS

| | | | |
|---|---|---|---|
| 2011/0249074 A1* | 10/2011 | Cranfill et al. | 348/14.02 |
| 2012/0195471 A1* | 8/2012 | Newcombe et al. | 382/106 |
| 2013/0041615 A1* | 2/2013 | Gillis | 702/134 |

OTHER PUBLICATIONS

Fransens et al., Optical flow based super-resolution: A probabilistic approach, Computer Vision and Image Understanding vol. 106, Jan. 2007, pp. 106-115.

Jin et al., "Real-Time Feature Tracking and Outlier Rejection with Changes in Illumination," Proceedings, Eighth IEEE International Conference on Computer Vision (ICCV), vol. 1, 2001, pp. 684-689.

Jiang et al., "Practical Super-Resolution from Dynamic Video Sequences," Proceedings of the 2003 IEEE Computer Society Conference on Computer Vision and Pattern Recognition, vol. 2, Jun. 2003, pp. 549-554.

Takeda et al., "Super-Resolution Without Explicit Subpixel Motion Estimation," IEEE Transactions on Image Processing, vol. 18, No. 9, Sep. 2009, pp. 1958-1975.

EP search report dated Feb. 13, 2013 regarding application 12185982.1, reference P55833EP/RGH, applicant The Boeing Company, 8 pages.

Irani et al., "Motion Analysis for Image Enhancement: Resolution, Occlusion, and Transparency," Journal of Visual Communication and Image Representation, Academic Press, Inc., vol. 4, No. 4, Dec. 1993, pp. 324-335.

Letienne et al., "Fast Super-Resolution on Moving Objects in Video Sequences," 16th European Signal Processing Conference, Jan. 2008, 5 pages.

Min et al., "Super-Resolution Image Reconstruction: A Technical Overview," IEEE Signal Processing Magazine, IEEE Service Center, vol. 20, No. 3, May 2003, pp. 21-36.

Kramer et al., "Local Object-Based Super-Resolution Mosaicing From Low-Resolution Video,", Signal Processing, vol. 91, No. 8, Aug. 2011, pp. 1771-1780.

Van Eekeren et al., "Super-Resolution on Moving Objects and Background," IEEE International Conference on Image Processing, Oct. 2006, pp. 2709-2712.

Wheeler et al., "Moving Vehicle Registration and Super-Resolution," 36th IEEE Applied Imagery Pattern Recognition Workshop, Oct. 2007, 8 pages.

* cited by examiner

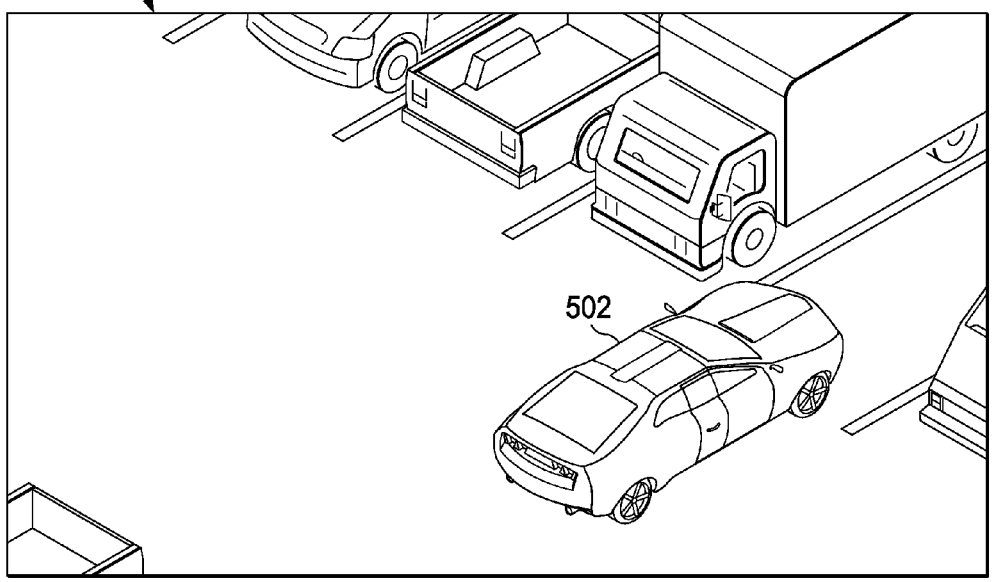
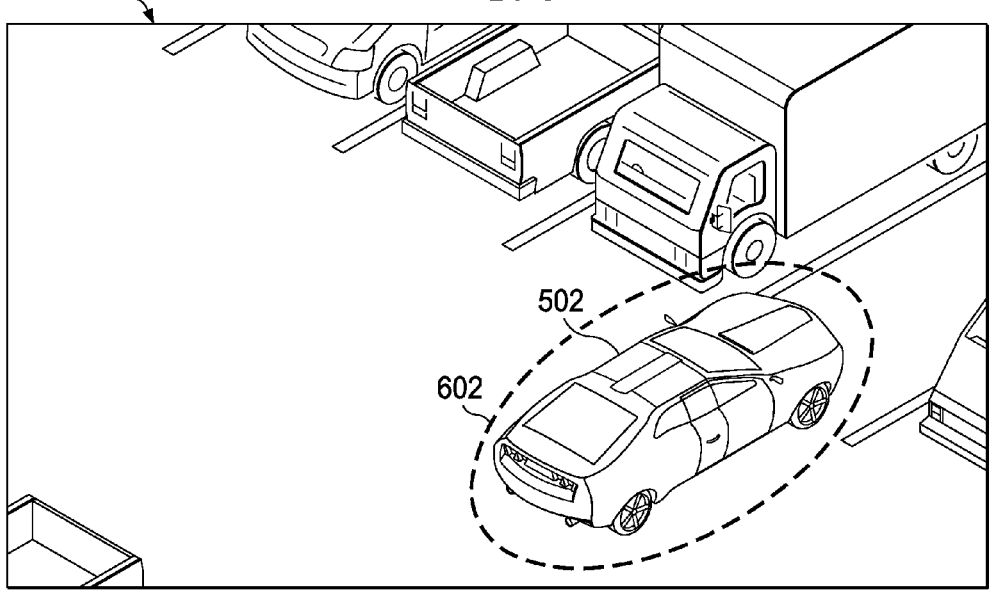

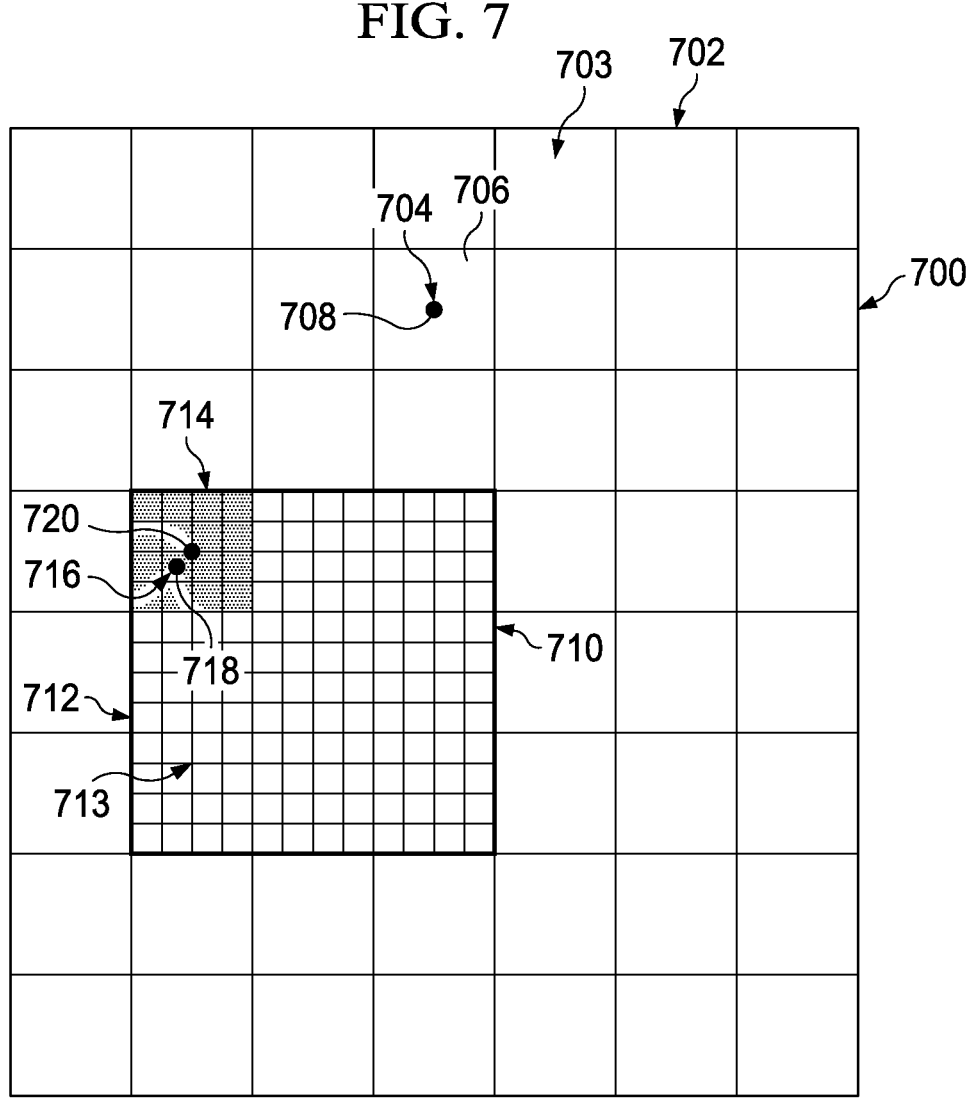

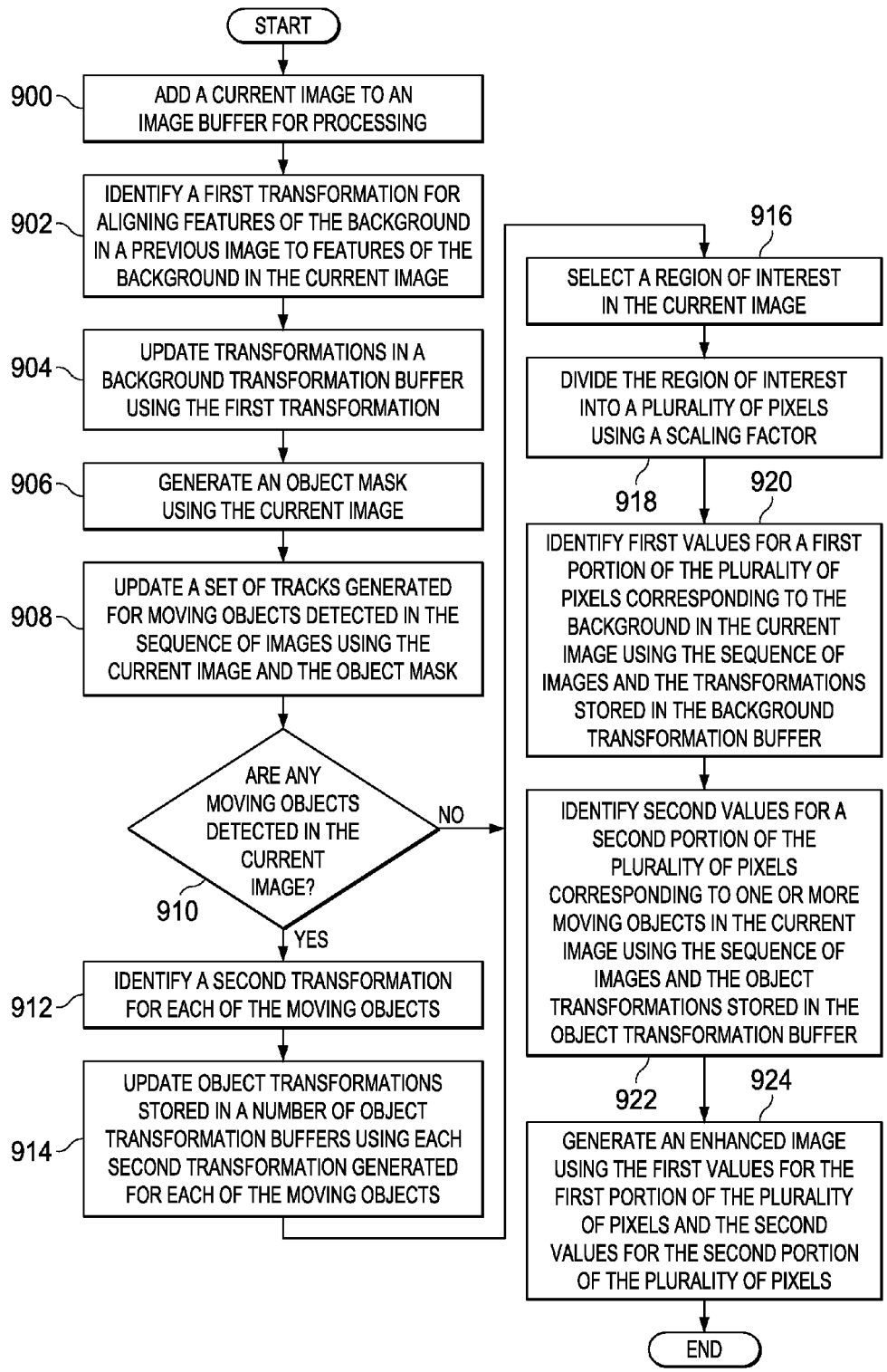

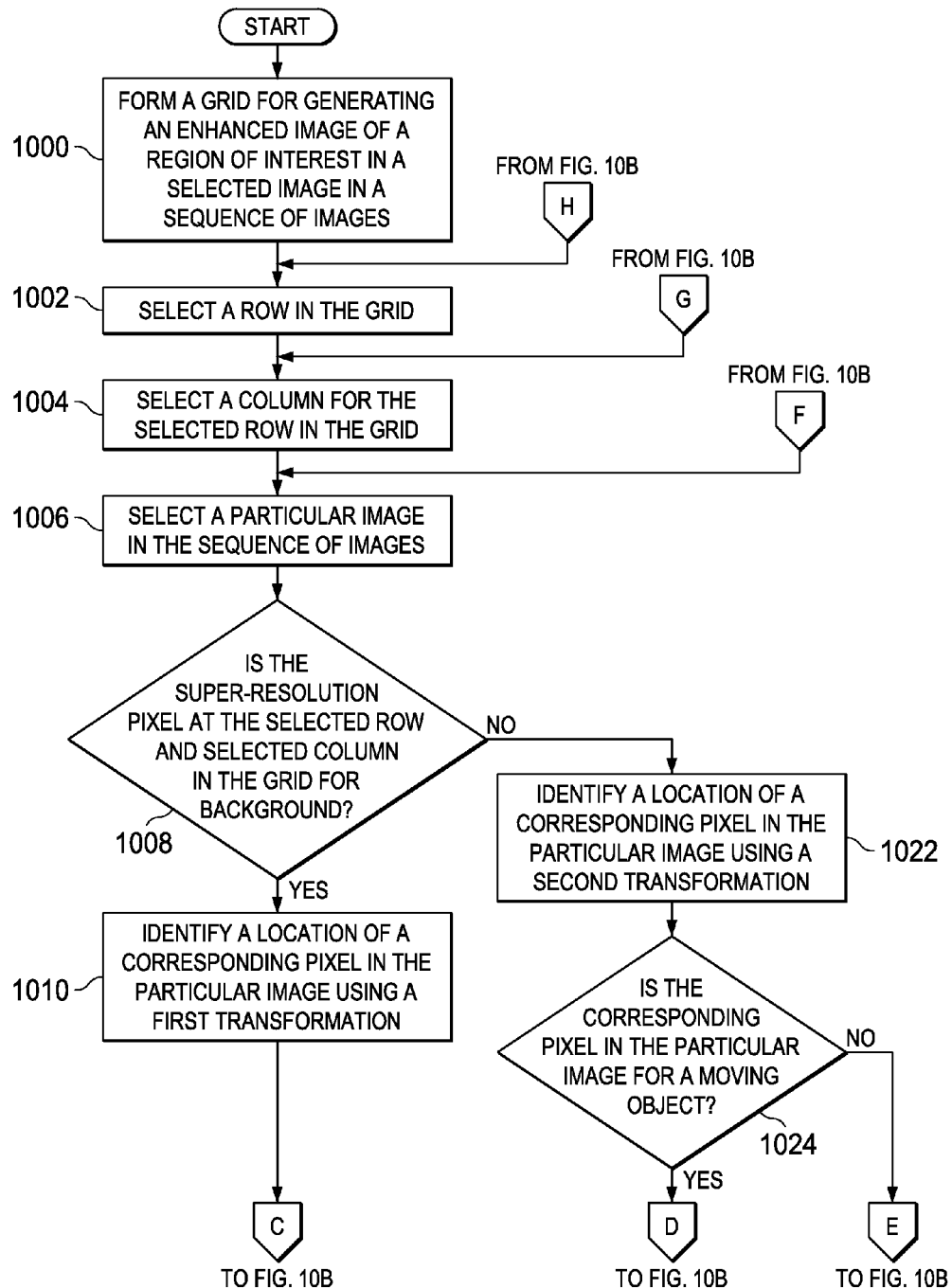

FIG. 11
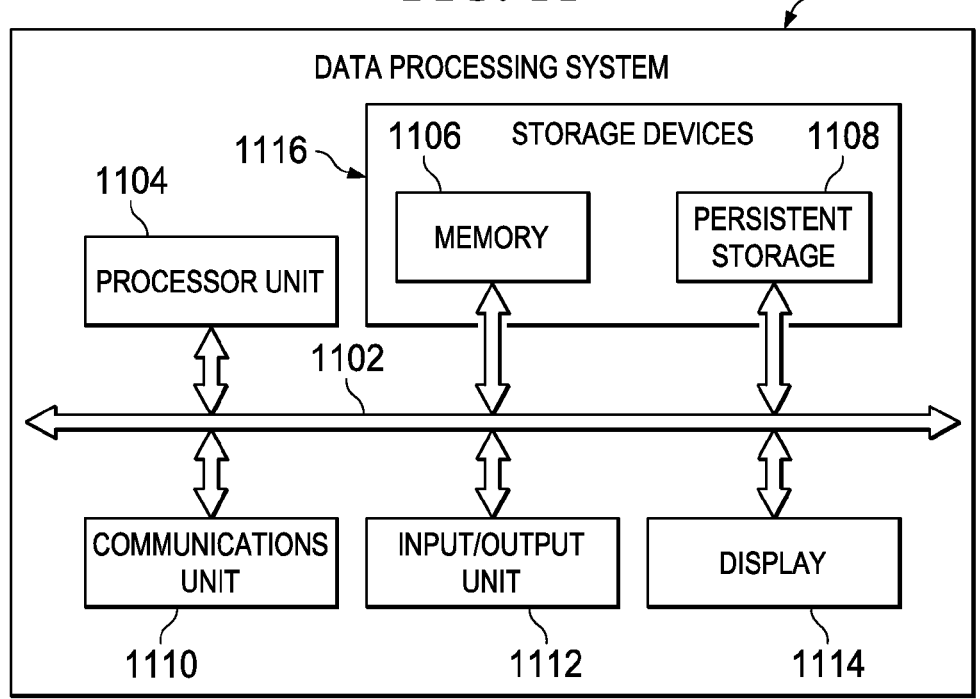
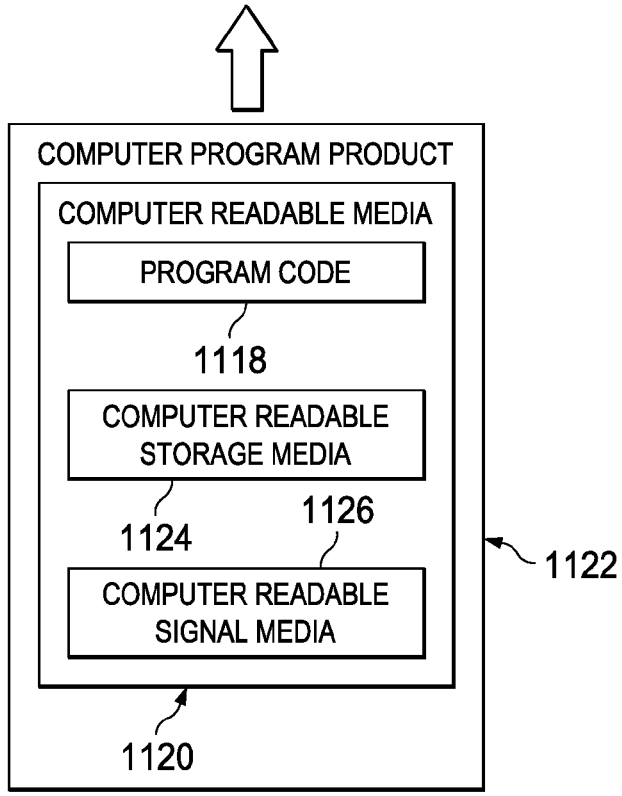

ENHANCING VIDEO USING SUPER-RESOLUTION

BACKGROUND INFORMATION

1. Field

The present disclosure relates generally to image processing and, in particular, to enhancing images using super-resolution. Still more particularly, the present disclosure relates to a method and apparatus for enhancing video containing moving objects using super-resolution.

2. Background

Currently, many different algorithms are available for performing super-resolution. Super-resolution is a process in which images of the same scene are used to reconstruct an image with a higher resolution than the resolution of the images of the scene. As used herein, the term "resolution" is used to mean "spatial resolution". Spatial resolution refers to the smallest possible feature that can be detected in an image. For example, smaller features can be detected in images having higher resolutions as compared to images having lower resolutions.

With super-resolution, multiple images of low resolution (LR) for a scene are used to reconstruct an image of high resolution (HR). Further, with super-resolution, the low resolution images used to construct the high resolution image cannot all be identical. Variation needs to be present between these low resolution images. For example, the low resolution images may be taken at different times, under different conditions, or both.

Typically, the low resolution images used to perform super-resolution are obtained from a sequence of images in the form of video. A sequence of images is a plurality of images ordered with respect to time. The different types of variation that may be present in these images include, for example, translational motion, rotational motion, different viewing angles, other types of motion, or any of these different types of variations in any combination. Translational motion between two images occurs when a current image of a scene is translated with respect to a previous image of the same scene parallel to the image plane. Rotational motion occurs when the current image is rotated with respect to the previous image. In some cases, variation is created when the current image is generated from a position closer to or further away from the scene as compared to the previous image.

With super-resolution, the low resolution images are first registered with respect to a selected reference coordinate system. Registration of these low resolution images includes aligning these images with respect to a reference coordinate system. For example, features in a first image may be aligned with the same features in a second image. However, when moving objects are present in the scene with respect to a background in the scene, registration of the low resolution images of the scene may not account for the moving objects. As a result, the high resolution image constructed from these low resolution images may be less accurate than desired.

Therefore, it would be advantageous to have a method and apparatus that takes into account at least some of the issues discussed above, as well as possibly other issues.

SUMMARY

In one advantageous embodiment, a method for processing images is provided. A portion of a selected image in which a moving object is present is identified. The selected image is one of a sequence of images. The moving object moves with respect to a background in the selected image. A plurality of pixels in a region of interest is identified in the selected image. First values are identified for a first portion of the plurality of pixels using the sequence of images and first transformations. The first portion of the plurality of pixels corresponds to the background in the selected image. A first transformation in the first transformations is configured to align features of the background in one image in the sequence of images to the features of the background in the selected image. Second values are identified for a second portion of the plurality of pixels using the sequence of images and second transformations. The second portion of the plurality of pixels corresponds to the moving object in the selected image. A second transformation in the second transformations is configured to align features of the moving object in the one image in the sequence of images to the features of the moving object in the selected image.

In another advantageous embodiment, a method for enhancing an image is provided. A portion of a selected image in which a moving object is present is identified. The selected image is one of a sequence of images. The moving object moves with respect to a background in the selected image. A plurality of pixels in a region of interest is identified in the selected image. First values are identified for a first portion of the plurality of pixels using the sequence of images and first transformations. The first portion of the plurality of pixels corresponds to the background in the selected image. A first transformation in the first transformations is configured to align features of the background in one image in the sequence of images to the features of the background in the selected image. Second values are identified for a second portion of the plurality of pixels using the selected image. The second portion of the plurality of pixels corresponds to the moving object in the selected image.

In yet another advantageous embodiment, an apparatus comprises an object tracking module and an enhancement module. The object tracking module is configured to identify a portion of a selected image in which a moving object is present. The selected image is one of a sequence of images. The moving object moves with respect to a background in the selected image. The enhancement module is configured to identify a plurality of pixels in a region of interest in the selected image. The enhancement module is further configured to identify first values for a first portion of the plurality of pixels using the sequence of images and first transformations. The first portion of the plurality of pixels corresponds to the background in the selected image. A first transformation in the first transformations is configured to align features of the background in one image in the sequence of images to the features of the background in the selected image. The enhancement module is further configured to identify second values for a second portion of the plurality of pixels using the sequence of images and second transformations. The second portion of the plurality of pixels corresponds to the moving object in the selected image. A second transformation in the second transformations is configured to align the features of the moving object in the one image in the sequence of images to the features of the moving object in the selected image.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 5 is an illustration of an image generated by an imaging system in accordance with an advantageous embodiment;

FIG. 6 is an illustration of an enhanced image in accordance with an advantageous embodiment;

FIG. 7 is an illustration of pixels for a selected image in accordance with an advantageous embodiment;

FIG. 9 is an illustration of a flowchart of a process for enhancing video in accordance with an advantageous embodiment;

FIGS. 10A and 10B are illustrations of a flowchart of a process for selecting pixels in a sequence of images for estimating the value of each pixel in an enhanced image of a region of interest in accordance with an advantageous embodiment; and FIG. 11 is an illustration of a data processing system in accordance with an advantageous embodiment.

DETAILED DESCRIPTION

Figure 1:
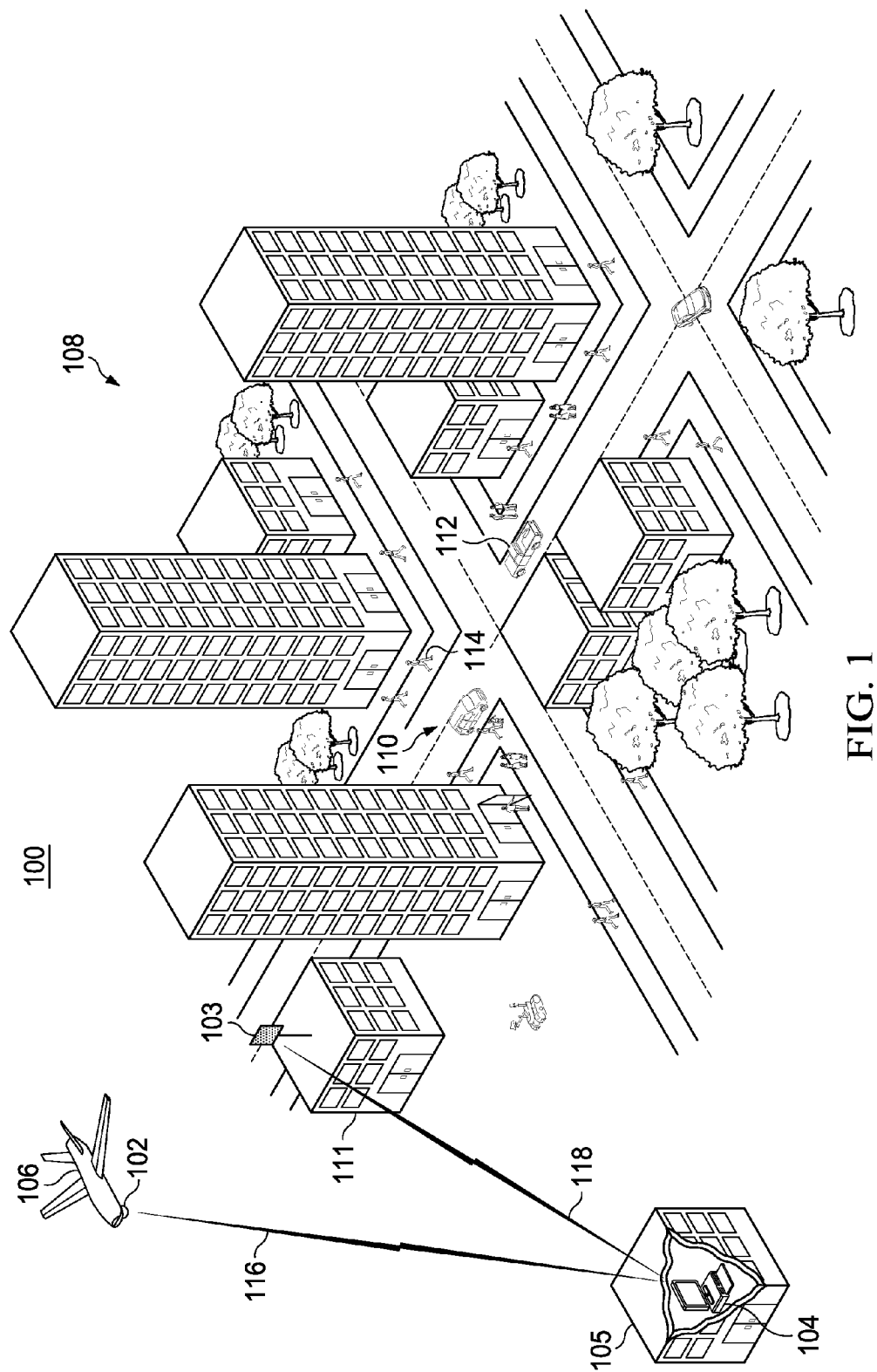
FIG. 1 is an illustration of an image processing environment in which an advantageous embodiment may be implemented.

The different advantageous embodiments recognize and take into account several different considerations. For example, the different advantageous embodiments recognize and take into account that currently, many different algorithms for performing super-resolution are available. However, the different advantageous embodiments recognize and take into account that some of these currently-available algorithms may be incapable of handling video of a scene containing objects that move relative to a background of the scene. As one illustrative example, some of these currently-available algorithms for super-resolution may be unable to take into account the movement of vehicles traveling along a highway in a scene.

The different advantageous embodiments recognize and take into account that some currently-available methods for performing super-resolution have limits on the amount of motion in the images. The different advantageous embodiments recognize and take into account that it may be desirable to have a method that can enhance video using super-resolution without placing limits on the amount of motion in the images.

Further, the different advantageous embodiments recognize and take into account that other currently-available methods for enhancing video containing moving objects may use optical flows identified in the video. Optical flow in video is the pattern of apparent motion of objects, surfaces, and edges in a visual scene caused by the relative motion between the video camera system and the scene. The different advantageous embodiments recognize and take into account that the currently-available methods for enhancing video using optical flows may produce results with more errors than desired. Additionally, these methods may require more time, processing resources, or both, than desired.

Thus, the different advantageous embodiments provide a method and apparatus for enhancing video using super-resolution. In particular, the different advantageous embodiments provide a method and apparatus that enhances video of a scene in which objects move relative to a background of the scene using super-resolution techniques.

In one advantageous embodiment, a method for processing images is provided. A portion of a selected image in which a moving object is present is identified. The selected image is one of a sequence of images. The moving object moves with respect to a background in the selected image. A plurality of pixels in a region of interest is identified in the selected image. First values are identified for a first portion of the plurality of pixels using the sequence of images and first transformations. The first portion of the plurality of pixels corresponds to the background in the selected image.

A first transformation in the first transformations is configured to align features of the background in one image in the sequence of images to the features of the background in the selected image. Second values are identified for a second portion of the plurality of pixels using the sequence of images and second transformations. The second portion of the plurality of pixels corresponds to the moving object in the selected image. A second transformation in the second transformations is configured to align features of the moving object in the one image in the sequence of images to the features of the moving object in the selected image.

With reference now to FIG. 1, an illustration of an image processing environment is depicted in accordance with an advantageous embodiment. In this illustrative example, image processing environment 100 includes imaging system 102, imaging system 103, and computer system 104. Computer system 104 is located at control station 105 in this example. Computer system 104 is configured to process images generated by imaging system 102 and imaging system 103.

As depicted, imaging system 102 is attached to unmanned aerial vehicle (UAV) 106. Imaging system 102 is configured to generate images of scene 108 as unmanned aerial vehicle 106 flies over scene 108. In this illustrative example, moving objects 110 are present in scene 108. Moving objects 110 in scene 108 include vehicles 112 and people 114.

The images that are generated by imaging system 102 form a video of scene 108. A video is a sequence of images ordered with respect to time. As unmanned aerial vehicle 106 flies over scene 108, the images generated may capture different portions of scene 108 over time, capture scene 108 from different viewing angles with respect to scene 108, or both. As a result, variations are present between the images generated by imaging system 102.

Additionally, imaging system 103 is attached to building 111. Imaging system 103 is also configured to generate images that form a video of scene 108. Further, imaging system 103 may move as the video of scene 108 is being generated. For example, imaging system 103 may pan scene 108. In this manner, imaging system 103 may generate images that capture different portions of scene 108 over time, capture scene 108 from different viewing angles with respect to scene 108, or both. As a result, variations are present between the images generated by imaging system 103.

Imaging system 102 and imaging system 103 send the images generated for scene 108 to computer system 104 for processing. In particular, imaging system 102 and imaging system 103 send these images to computer system 104 using wireless communications link 116 and wireless communications link 118, respectively. In this illustrative example, imaging system 102 and imaging system 103 may be configured to send the images generated for scene 108 to computer system 104 in substantially real-time. In other words, these imaging systems may send images to computer system 104 for processing as these images are being generated.

Computer system 104 is configured to process the images generated by imaging system 102 and the images generated by imaging system 103 to construct images of scene 108 that have a higher resolution as compared to the images generated by imaging system 102 and imaging system 103. In particular, computer system 104 may use super-resolution to enhance the video generated by imaging system 102 and the video generated by imaging system 103.

Further, computer system 104 takes into account the presence of moving objects 110 within scene 108 when enhancing the video generated by imaging system 102 and the video generated by imaging system 103. In particular, computer system 104 enhances the portion of the videos corresponding to the background in the video independently of the portion of the videos corresponding to moving objects 110 captured in the videos using super-resolution.

Figure 2:
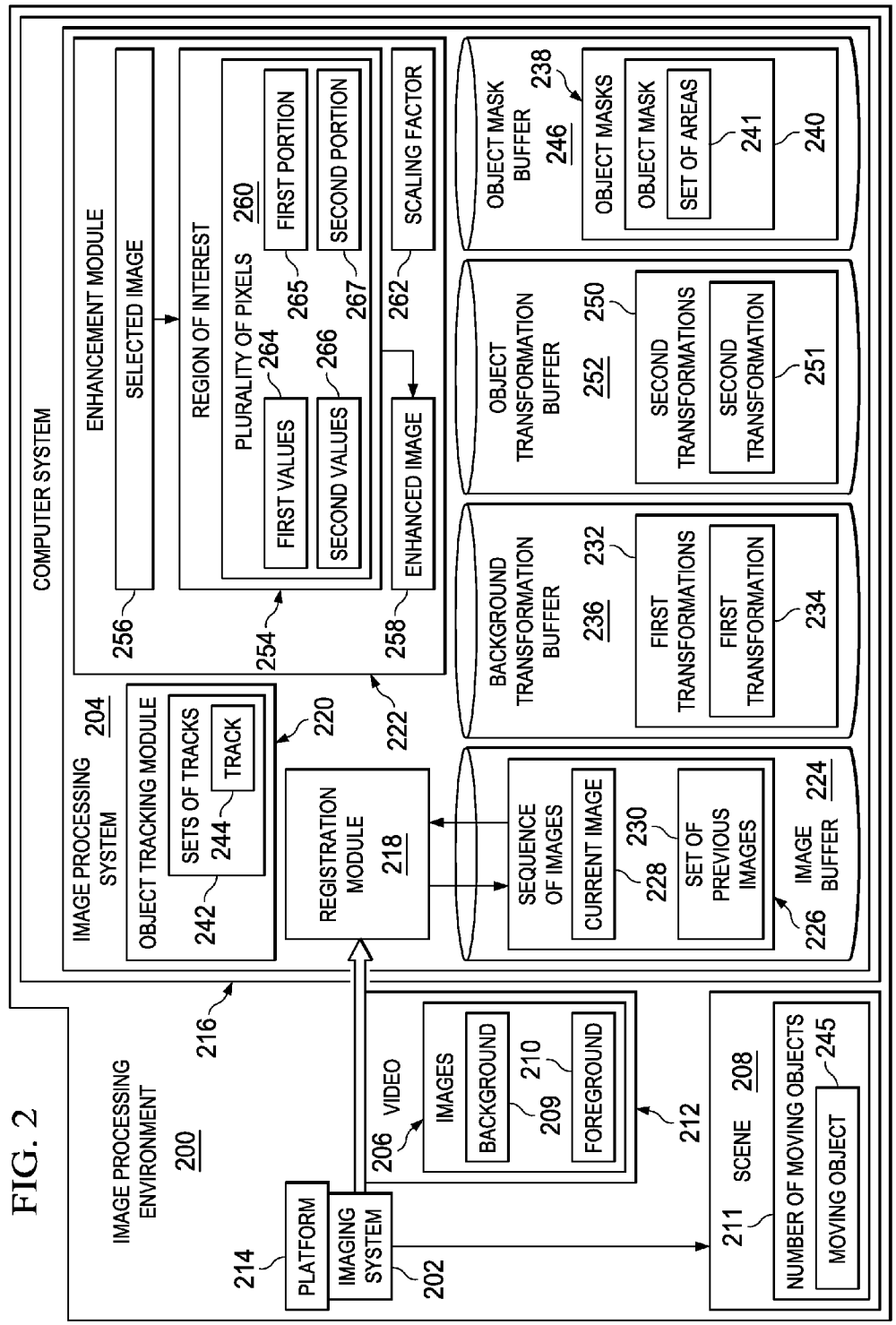
FIG. 2 is an illustration of a block diagram of an image processing environment in accordance with an advantageous embodiment.

With reference now to FIG. 2, an illustration of a block diagram of an image processing environment is depicted in accordance with an advantageous embodiment. Image processing environment 100 in FIG. 1 is an example of one implementation for image processing environment 200. In these illustrative examples, imaging processing environment 200 includes imaging system 202 and image processing system 204. Image processing system 204 is configured to process images 206 generated by imaging system 202.

As depicted, imaging system 202 is configured to generate images 206 of scene 208. Scene 208 may be any physical area of interest, such as, for example, without limitation, an area in a city, a neighborhood block, an area in a forest, an area over a desert, a region of airspace, a region of space, a portion of a highway, an area inside a manufacturing facility, or some other suitable area of interest.

As depicted, each image in images 206 of scene 208 includes background 209 and foreground 210. Background 209 is the part of an image that lies outside the one or more objects of interest captured by the image. Background 209 in an image may include, for example, without limitation, land, trees, bushes, desert sand, water, air, space, clouds, roads, mountains, valleys, a river, an ocean, buildings, manmade structures, or other types of objects, either alone or in combination, depending on scene 208.

The one or more objects of interest in scene 208 captured by an image form foreground 210 of the image. For example, foreground 210 of an image in images 206 may capture number of moving objects 211 in scene 208. As used herein, a "number of" items means one or more items. In this manner, a number of moving objects means one or more moving objects.

Number of moving objects 211 may include, for example, without limitation, at least one of a vehicle, an aircraft, a person, an animal, a mobile platform, or some other suitable type of object that is capable of moving. As used herein, the phrase "at least one of", when used with a list of items, means different combinations of one or more of the listed items may be used and only one of each item in the list may be needed. For example, "at least one of item A, item B, and item C" may include, for example, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

In these illustrative examples, imaging system 202 is configured to generate images 206 that form video 212. When the camera system generates images 206 in the form of video 212, imaging system 202 may be referred to as a camera system or a video camera system. Further, images 206 in video 212 may take the form of, for example, without limitation, visible light images, infrared images, radar images, and/or other suitable types of images, depending on the type of imaging system.

In these illustrative examples, imaging system 202 may be associated with platform 214. Platform 214 may be selected from one of, for example, without limitation, a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a manufacturing facility, a building, and some other suitable type of platform.

The association between imaging system 202 and platform 214 is a physical association in these depicted examples. Imaging system 102 attached to unmanned aerial vehicle 106 and imaging system 103 attached to building 111 in FIG. 1 are examples of implementations for imaging system 202 associated with platform 214.

In these illustrative examples, a first component, such as imaging system 202, may be considered to be associated with a second component, such as platform 214, by being secured to the second component, bonded to the second component, mounted to the second component, welded to the second component, fastened to the second component, connected to the second component in some other suitable manner, or in a combination of suitable manners. The first component also may be connected to the second component using a third component. The first component may also be considered to be associated with the second component by being formed as part of or as an extension of the second component.

Imaging system 202 sends video 212 to image processing system 204 for processing. Image processing system 204 may be implemented using hardware, software, or a combination of both. In these illustrative examples, image processing system 204 is implemented in computer system 216. Computer system 216 may comprise a number of computers. When more than one computer is present in computer system 216, these computers may be in communication with each other.

As depicted, image processing system 204 includes registration module 218, object tracking module 220, and enhancement module 222. Registration module 218 receives images 206 in video 212 for processing.

In one illustrative example, registration module 218 receives images 206 in video 212 as these images are generated. In other words, registration module 218 may receive images 206 in substantially real-time. Of course, in other illustrative examples, registration module 218 may receive images 206 in video 212 after all of images 206 have been generated.

Registration module 218 stores images 206 in image buffer 224. In particular, image buffer 224 has length, N. In other words, image buffer 224 comprises N elements. Image buffer 224 can store up to N images at any given point in time in these N elements. Image buffer 224 takes the form of a circular buffer in these illustrative examples. A circular buffer is a buffer of fixed length that overwrites the oldest data in the buffer when the buffer is full.

In these illustrative examples, the one or more images stored in image buffer 224 form sequence of images 226 in image buffer 224. Sequence of images 226 may include one to N consecutive images. In particular, sequence of images 226 includes current image 228 and set of previous images 230. As used herein, a "set of" items means zero or more items. For example, a set of previous images is zero, one, or more previous images. In this manner, a set of previous images may be a null or empty set.

Current image 228 is stored in the first element in image buffer 224, while set of previous images 230 are stored in the elements after the first element in image buffer 224. In some illustrative examples, sequence of images 226 may be referred to as "joint frames", and image buffer 224 may be referred to as a "joint frame buffer."

Further, registration module 218 identifies first transformations 232 for registering images 206 with respect to background 209 in each of images 206. Registering images comprises aligning the images with respect to common features, a common coordinate system, some other common frame of reference, or multiple frames of reference. First transformation 234 is an example of one of first transformations 232. First transformation 234 is configured to align features of background 209 in one image in images 206 with features of background 209 in another image in images 206.

In these illustrative examples, first transformations 232 may take the form of transformations selected from a group consisting of affine transformations, homographic transformations, some other suitable type of transformation, or a combination of transformations. An affine transformation may comprise one or more of a linear transformation, a rotation, a scaling, a translation, and a shear transformation.

Registration module 218 is configured to store first transformations 232 generated by registration module 218 in background transformation buffer 236. In these illustrative examples, background transformation buffer 236 has length N and also may take the form of a circular buffer. Registration module 218 may store first transformations 232 to background transformation buffer 236 as first transformations 232 are generated.

Object tracking module 220 is configured to detect and track number of moving objects 211 in scene 208 in one or more of images 206. Object tracking module 220 may use any number of currently-available methods for detecting and tracking number of moving objects 211 in images 206. For example, object tracking module 220 may use moving object detection algorithms, object segmentation algorithms, a mean-shift tracking algorithm, the Lucas-Kanade method, other suitable types of algorithms, either alone or in combination, to detect and track number of moving objects 211.

In particular, object tracking module 220 generates object masks 238 using images 206. An object mask may also be referred to as an object map. Object mask 240 is an example of one of object masks 238. Object mask 240 is generated for an image in images 206 that has been processed and added to image buffer 224. In these illustrative examples, object mask 240 is a binary image. A binary image is an image in which each pixel has a value of either logic "1" or logic "0".

For example, object mask 240 may have set of areas 241 that represents moving objects. In particular, each area in set of areas 241 represents a moving object that has been detected in the image for which object mask 240 was generated. Each of the pixels within set of areas 241 has a value of logic "1", and each of the pixels outside set of areas 241 has a value of logic "0". In this manner, pixels having a value of logic "1" in object mask 240 represent foreground 210 in the corresponding image. Further, pixels having a value of logic "0" in object mask 240 represent background 209 in the corresponding image.

Object tracking module 220 stores object masks 238 generated by object tracking module 220 in object mask buffer 246. Object mask buffer 246 has length N and also may take the form of a circular buffer. Object tracking module 220 stores object masks 238 as object masks 238 are generated.

Additionally, object tracking module 220 also may be configured to generate sets of tracks 242 for moving objects detected in images 206. Sets of tracks 242 may be generated using object masks 238, images 206, or both. In these illustrative examples, each set of tracks in sets of tracks 242 corresponds to an image in images 206. Further, each track in a set of tracks is for a moving object detected in the corresponding image. In this manner, each set of tracks in sets of tracks 242 may correspond to set of areas 241. In other words, a track in one of sets of tracks 242 may be generated for an object represented in a corresponding one of set of areas 241 in a corresponding image.

Track 244 is an example of a track in sets of tracks 242 generated for an image. Object tracking module 220 generates track 244 when moving object 245 is detected in an image in images 206. In these illustrative examples, track 244 includes a track identifier that is unique to moving object 245. In other words, tracks generated for different images may have the same track identifier when these tracks are generated for the same moving object in the different images.

Further, track 244 may include a location at which moving object 245 is depicted in the corresponding image. This location may be selected as, for example, a center of moving object 245 in the corresponding image. In these illustrative examples, this location may be defined using, for example, an x-y coordinate system for the image, some other suitable type of coordinate system, or a combination of coordinate systems for the image.

Track 244 also may include a size of moving object 245 in the corresponding image. The size of the object may be defined as minima and maxima for both the x and y coordinates for moving object 245. In other illustrative examples, the location, size, or both location and size of moving object 245 included in track 244 may be defined with respect to the x-y coordinate system for the object mask in object masks 238 generated for the corresponding image.

In some illustrative examples, object tracking module 220 may replace the values of pixels in an area in set of areas 241 in object mask 240 with a track identifier for the track corresponding to the area. For example, an area in set of areas 241 in object mask 240 may represent moving object 245. Object tracking module 220 may replace the values of pixels in this area with the track identifier for track 244 for moving object 245. This type of object mask may be referred to as an augmented object mask.

In this manner, each pixel in an object mask may have a value selected from one of a first value and a second value. When the object mask is a regular object mask, the first value may be a logic "0" and the second value may be a logic "1". When the object mask is an augmented object mask, the first value may be a logic "0" and the second value may be a track identifier.

Registration module 218 uses images 206, object masks 238, and sets of tracks 242 to generate second transformations 250 for each one of number of moving objects 211 detected in sequence of images 226. Similar to first transformations 232, second transformations 250 may take the form of, for example, without limitation, transformations selected from the group consisting of affine transformations, homographic transformations, some other suitable type of transformation, or a combination of transformations.

As one illustrative example, second transformations 250 may be generated for moving object 245. Second transformation 251 is an example of one of second transformations 250. Second transformation 251 may be configured to align features of moving object 245 in one image in images 206 with features of moving object 245 in another image in images 206.

In these illustrative examples, registration module 218 stores second transformations 250 for moving object 245 in object transformation buffer 252. Object transformation buffer 252 has length N and also may take the form of a circular buffer. A different object transformation buffer may be generated for each moving object detected in images 206. Registration module 218 stores second transformations 250 in object transformation buffer 252 as second transformations 250 are generated.

In these illustrative examples, enhancement module 222 uses sequence of images 226 stored in image buffer 224, first transformations 232 stored in background transformation buffer 236, and second transformations 250 stored in object transformation buffer 252 to enhance video 212 generated by imaging system 202. In particular, enhancement module 222 uses sequence of images 226, first transformations 232, and second transformations 250 to enhance region of interest 254 for selected image 256 in sequence of images 226.

For example, enhancement module 222 selects region of interest 254 in selected image 256 for enhancement. Selected image 256 may be, for example, current image 228 in sequence of images 226 stored in image buffer 224. Of course, in other illustrative examples, selected image 256 may be any one of sequence of images 226. In these illustrative examples, region of interest 254 may include an area in selected image 256 in which moving object 245 is detected. Enhancing region of interest 254 comprises increasing the resolution of region of interest 254 as compared to the other portions of selected image 256.

In these depicted examples, enhancement module 222 uses currently-available methods for performing super-resolution to enhance a first portion of region of interest 254 corresponding to background 209 in selected image 256 independently of a second portion of region of interest 254 corresponding to moving object 245. Super-resolution of these two portions of region of interest 254 is then combined to construct enhanced image 258. Enhanced image 258 of region of interest 254 has a higher resolution as compared to region of interest 254 in selected image 256.

In one illustrative example, enhancement module 222 divides region of interest 254 into plurality of pixels 260. Enhancement module 222 may divide region of interest 254 into plurality of pixels 260 using scaling factor 262. Scaling factor 262 determines how many pixels in plurality of pixels 260 make up a single pixel in selected image 256. For example, selected image 256 may have 100 pixels arranged in a 10 by 10 grid. If scaling factor 262 is selected as three, each pixel in selected image 256 is divided into nine pixels arranged in a three by three grid.

Enhancement module 222 identifies which pixels in plurality of pixels 260 form first portion 265 of plurality of pixels 260 corresponding to background 209 in selected image 256 and which pixels form second portion 267 of plurality of pixels 260 corresponding to moving object 245 in selected image 256. In particular, enhancement module 222 identifies first portion 265 and second portion 267 using the corresponding object mask in objects masks 238 generated for selected image 256.

In these illustrative examples, object mask 240 may correspond to selected image 256. Further, set of areas 241 in object mask 240 may be one area that represents moving object 245 that appears in selected image 256. A pixel in plurality of pixels 260 having a corresponding pixel in object mask 240 with a value of logic "0" is included in first portion 265. A pixel in plurality of pixels 260 having a corresponding pixel in object mask 240 with a value of logic "1" is included in second portion 267.

Enhancement module 222 identifies first values 264 for first portion 265 of plurality of pixels 260 corresponding to background 209 in selected image 256 using sequence of images 226 and first transformations 232. Further, enhancement module 222 identifies second values 266 for second portion 267 of plurality of pixels 260 corresponding to moving object 245 in selected image 256 using sequence of images 226 and second transformations 250.

In these illustrative examples, enhancement module 222 uses first values 264 and second values 266 to construct enhanced image 258 of region of interest 254. When a new image in images 206 is received, this new image may be added to image buffer 224 as current image 228. Further, the images stored in image buffer 224 are shifted such that the oldest image stored in image buffer 224 is pushed out of image buffer 224 and a new sequence of images is formed.

Selected image 256 for this new sequence of images may be the new image added as current image 228. Enhancement module 222 is configured to generate a new enhanced image using the new sequence of images. The new enhanced image may be generated for region of interest 254 or a new region of interest. In some cases, a new scaling factor may also be selected.

The illustration of image processing environment 200 in FIG. 2 is not meant to imply physical or architectural limitations to the manner in which an advantageous embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an advantageous embodiment.

For example, in some illustrative examples, sets of tracks 242 may be stored in an additional buffer or some other suitable type of data structure. In other illustrative examples, a separate module may be configured to store images 206 in image buffer 224 instead of registration module 218.

Figure 3:
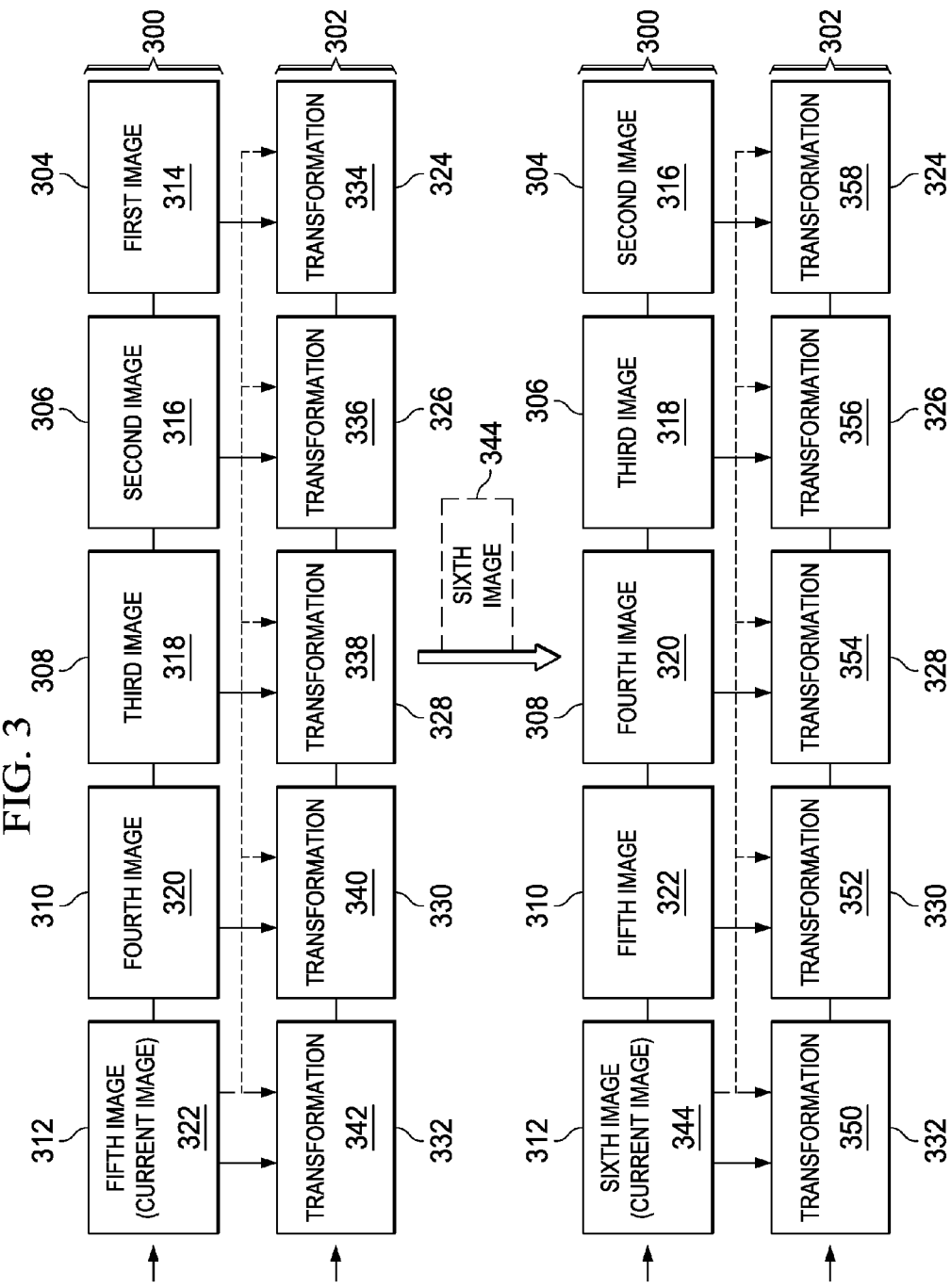
FIG. 3 is an illustration of an image buffer and a background transformation buffer in accordance with an advantageous embodiment.

With reference now to FIG. 3, an illustration of an image buffer and a background transformation buffer is depicted in accordance with an advantageous embodiment. In this illustrative example, image buffer 300 is an example of one implementation for image buffer 224 in FIG. 2. Further, background transformation buffer 302 is an example of one implementation for background transformation buffer 236 in FIG. 2. Image buffer 300 and background transformation buffer 302 are circular buffers in this depicted example.

Registration module 218 in FIG. 2 stores images, such as images 206 in FIG. 2, in image buffer 300. The images stored in image buffer 300 form sequence of images 226 in FIG. 2. Further, registration module 218 in FIG. 2 stores transformations, such as first transformations 232 in FIG. 2, in background transformation buffer 302.

As depicted, image buffer 300 comprises elements 304, 306, 308, 310, and 312. In image buffer 300, element 304 stores the oldest image in image buffer 300, while element 312 stores the most recent image. Images 314, 316, 318, 320, and 322 have been stored in elements 304, 306, 308, 310, and 312, respectively. Images 314, 316, 318, 320, and 322 are examples of the images in sequence of images 226 in FIG. 2.

In this illustrative example, image 314, stored in element 304, is the oldest image stored in image buffer 300. Image 322, stored in element 312, is the most recent image stored in image buffer 300 and is the current image being processed.

Background transformation buffer 302 comprises elements 324, 326, 328, 330, and 332. In background transformation buffer 302, element 324 is configured to store the oldest transformation, while element 332 is configured to store the most recent transformation.

As depicted, transformations 334, 336, 338, 340, and 342 are stored in elements 324, 326, 328, 330, and 332, respectively. Transformations 334, 336, 338, 340, and 342 are examples of first transformations 232 in FIG. 2. These transformations are identified by registration module 218 in FIG. 2 with respect to the most recent image added to image buffer 300, which is image 322.

In this depicted example, transformations 334, 336, 338, 340, and 342 correspond to images 314, 316, 318, 320, and 322, respectively. In particular, transformations 334, 336, 338, 340, and 342 are configured to align features of the backgrounds of images 314, 316, 318, 320, and 322, respectively, with features of the background in image 322.

As one illustrative example, transformation 334 is configured to align features of the background in image 314 with features of the background in image 322 when transformation 334 is applied to image 314. As another example, transformation 340 is configured to align features of the background in image 320 with features of the background in image 322 when transformation 340 is applied to image 320. Further, transformation 342 is an identity transformation for image 322 in this illustrative example. In other words, transformation 342 does not change image 322.

When a new image, such as image 344, is added to image buffer 300, the images previously stored in the elements of image buffer 300 are shifted by one element such that the oldest image stored in image buffer 300 is pushed out of image buffer 300. In particular, when image 344 is added to image buffer 300, image 316 shifts from being stored in element 306 to being stored in element 304. In this manner, image 314 is overwritten in element 304 when image 344 is added to image buffer 300.

Further, when image 344 is added to image buffer 300, registration module 218 in FIG. 2 adds a new identity transformation corresponding to image 344 to background transformation buffer 302. This new identify transformation is stored in element 332 as transformation 350. Thereafter, the previously identified transformations stored in background transformation buffer 302 are shifted by one element and updated to form new transformations. When the previously identified transformations are shifted, transformation 334 is removed from background transformation buffer 302.

In particular, registration module 218 in FIG. 2 identifies a new transformation that is configured to align features of the background in image 322 to features of the background in image 344. This new transformation is combined with transformation 342 to form transformation 352. Transformation 352 is stored in element 330.

Further, the new transformation is also combined with transformation 340 to form transformation 354. Transformation 354 is then stored in element 328. The new transformation is combined with transformation 338 to form transformation 356. Transformation 356 is then stored in element 326. Additionally, the new transformation is combined with transformation 336 to form transformation 358. Transformation 358 is stored in element 324.

In this manner, image buffer 300 and background transformation buffer 302 are updated each time a new image is added to image buffer 300.

Figure 4:
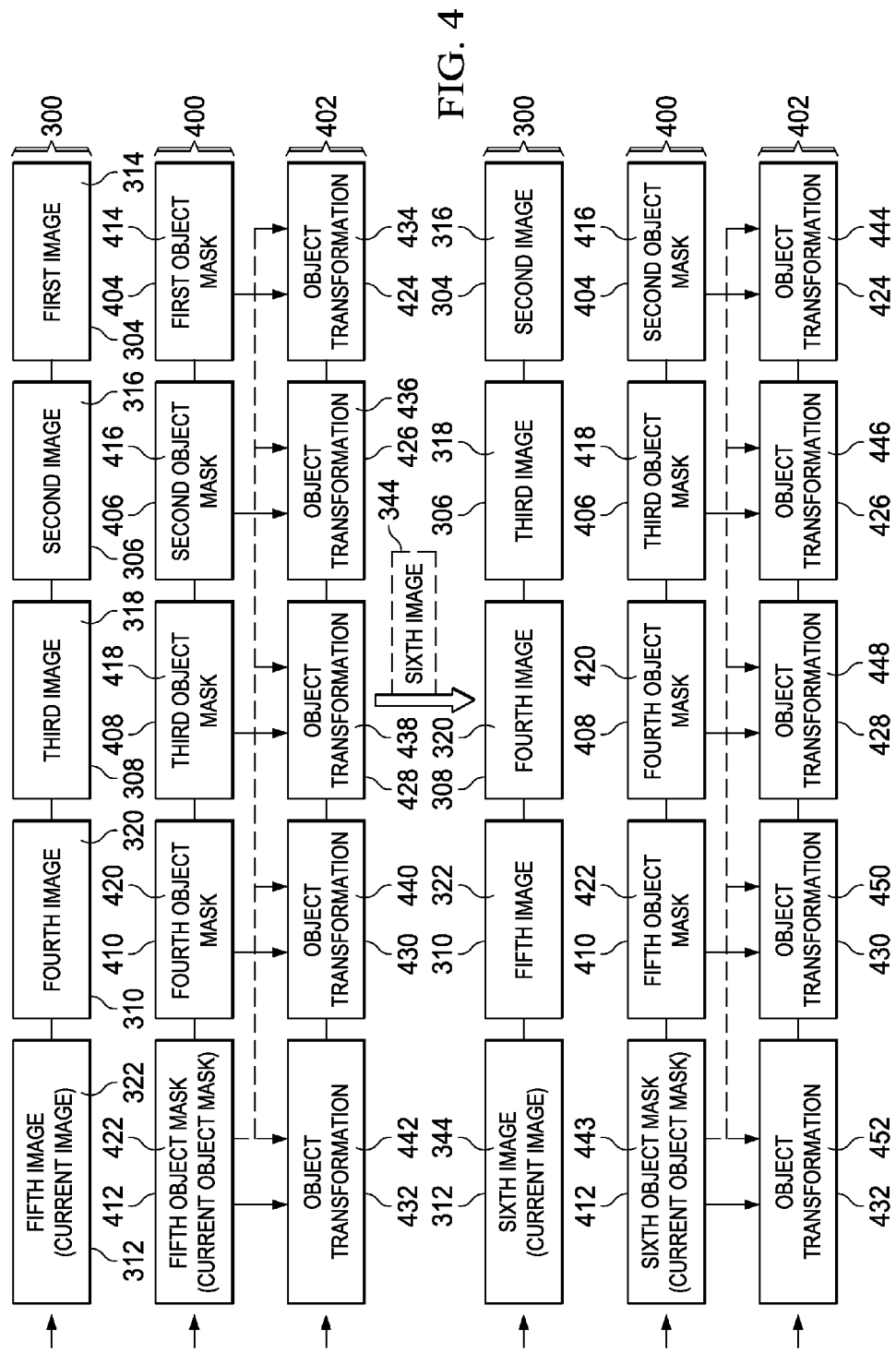
FIG. 4 is an illustration of an image buffer, an object mask buffer, and an object transformation buffer in accordance with an advantageous embodiment.

With reference now to FIG. 4, an illustration of an image buffer, an object mask buffer, and an object transformation buffer is depicted in accordance with an advantageous embodiment. In this illustrative example, image buffer 300 from FIG. 3 is depicted. Further, object mask buffer 400 and object transformation buffer 402 are also depicted. Object mask buffer 400 is an example of one implementation for object mask buffer 246 in FIG. 2. Object transformation buffer 402 is an example of one implementation for object transformation buffer 252 in FIG. 2.

Object mask buffer 400 comprises elements 404, 406, 408, 410, and 412. Object tracking module 220 in FIG. 2 is configured to store object masks 414, 416, 418, 420, and 422 in elements 404, 406, 408, 410, and 412, respectively, of object mask buffer 400.

Object masks 414, 416, 418, 420, and 422 correspond to images 314, 316, 318, 320, and 322, respectively. For example, object mask 416 corresponds to image 316. Object tracking module 220 in FIG. 2 generates object mask 416 using image 316.

In this illustrative example, a moving object, such as moving object 245 in FIG. 2, is detected in each of images 314, 316, 318, 320, and 322. As a result, each of object masks 414, 416, 418, 420, and 422 contains at least one area having pixels with a value of logic "1".

Additionally, object transformation buffer 402 comprises elements 424, 426, 428, 430, and 432. Registration module 218 in FIG. 2 is configured to identify object transformations 434, 436, 438, 440, and 442 and store these object transformations in elements 424, 426, 428, 430, and 432, respectively. Object transformations 434, 436, 438, 440, and 442 are examples of second transformations 250 for moving object 245 in FIG. 2. Object transformations 434, 436, 438, 440, and 442 correspond to images 314, 316, 318, 320, and 322, respectively.

For example, object transformation 436 is configured to align an area in image 316 in which a moving object has been detected with an area in image 322 in which the same moving object has been detected. Similarly, object transformation 438 is configured to align an area in image 318 in which the moving object has been detected with an area in image 322 in which the same moving object has been detected.

Registration module 218 in FIG. 2 identifies object transformations 434, 436, 438, 440, and 442 using both the images stored in image buffer 300 and the object masks stored in object mask buffer 400. For example, when identifying object transformation 438, registration module 218 takes into account only the pixels in image 318 that have corresponding pixels in object mask 418 with a value of logic "1" and the pixels in image 322 that have corresponding pixels in object mask 422 with a value of logic "1".

When image 344 is added to image buffer 300, object tracking module 220 in FIG. 2 generates object mask 443 for image 344 and shifts the object masks stored in object mask buffer 400 by one element such that object mask 414 is overwritten. Additionally, when object mask 414 has been added to object mask buffer 400, registration module 218 in FIG. 2 updates the object transformations stored in object transformation buffer 402. In particular, registration module 218 updates object transformation buffer 402 with object transformations 444, 446, 448, 450, and 452 stored in elements 424, 426, 428, 430, and 432, respectively.

In this illustrative example, object transformations 444, 446, 448, 450, and 452 are configured to align features of the moving object detected in images 316, 318, 320, 322, and 344, respectively, with features of the moving object detected in image 344. In this manner, object transformation 452 may be an identity transformation.

Further, in this illustrative example, the object transformations stored in object transformation buffer 402 may be individually recomputed each time a new image is added to image buffer 300. In this manner, a loss of a detection of a moving object in one of the images stored in image buffer 300 may only cause one element in object transformation buffer 402 to be undetermined.

With reference now to FIG. 5, an illustration of an image generated by an imaging system is depicted in accordance with an advantageous embodiment. In this illustrative example, image 500 is an example of one implementation for one of images 206 in video 212 in FIG. 2. Image 500 is part of video generated by an imaging system, such as imaging system 202 in FIG. 2. As depicted, moving object 502 is captured in image 500. Moving object 502 is a vehicle in this illustrative example.

Turning now to FIG. 6, an illustration of an enhanced image is depicted in accordance with an advantageous embodiment. In this illustrative example, enhanced image 600 is an example of one implementation for enhanced image 258 in FIG. 2. Enhanced image 600 is generated using image 500 in FIG. 5 and previous images in the video generated by the imaging system.

As depicted, enhanced image 600 has a higher resolution as compared to image 500 in FIG. 5. Further, the portion of enhanced image 600 corresponding to moving object 502 from image 500 is being tracked using track 602.

With reference now to FIG. 7, an illustration of pixels for a selected image is depicted in accordance with an advantageous embodiment. Selected image 700 is a low resolution image. In particular, in this depicted example, selected image 700 is an example of one implementation for selected image 256 in FIG. 2. In particular, selected image 700 is current image 228 in sequence of images 226 stored in image buffer 224 in FIG. 2.

In this illustrative example, selected image 700 is divided into grid 702 of squares 703. Each pixel for selected image 700 is a center of a square in grid 702. For example, center 704 of square 706 in grid 702 is pixel 708. Pixel 708 for square 706 may correspond to a background or a moving object in selected image 700.

As depicted, enhancement module 222 in FIG. 2 may select region of interest 710 in selected image 700 for enhancement. Enhancement module 222 divides the portion of squares 703 in region of interest 710 into smaller squares using a scaling factor to form grid 712 of smaller squares 713.

In this illustrative example, a scaling factor of 4 is used. With this scaling factor, each square in grid 702 in region of interest 710 is divided into smaller squares to form a section of four squares by four squares in region of interest 710. These different sections form grid 712 for region of interest 710. As one illustrative example, square 714 in grid 702 is divided to form a section of four squares by four squares.

Enhancement module 222 in FIG. 2 uses grid 712 for region of interest 710 to form an enhanced image, such as, for example, enhanced image 258 in FIG. 2. In particular, grid 712 is used to form an enhanced image in which each pixel for the enhanced image is a center of a square in grid 712. In these illustrative examples, each of the pixels in the enhanced image may be referred to as a super-resolution (SR) pixel. In some cases, each pixel in the enhanced image may be referred to as a high resolution (HR) pixel.

For example, the center of square 716 in grid 712 is pixel 718. Pixel 718 may be referred to as a super-resolution pixel. Enhancement module 222 estimates the final value for pixel 718 using set of previous images 230 stored in image buffer 224 in FIG. 2.

In particular, enhancement module 222 determines whether pixel 720 for square 714 in grid 702 corresponding to pixel 718 in square 716 of grid 712 is for a background in selected image 700 or a moving object in selected image 700. Enhancement module 222 uses an object mask generated for selected image 700 to determine whether the value for pixel 720 for square 714 indicates that pixel 720 is for the background or that pixel 720 is for the moving object.

If pixel 720 is for the background in selected image 700, enhancement module 222 uses first transformations 232 stored in background transformation buffer 236 in FIG. 2 to identify a location in each of set of previous images 230 in sequence of images 226 stored in image buffer 224 that corresponds to pixel 720. In other words, when pixel 718 is for background in selected image 700, enhancement module 222 identifies locations for pixel 718 in other images in sequence of images 226 using first transformations 232.

If pixel 720 is for the moving object in selected image 700, enhancement module 222 uses second transformations 250 stored in object transformation buffer 252 in FIG. 2 to identify a location in each of set of previous images 230 in sequence of images 226 stored in image buffer 224 that corresponds to pixel 720. In other words, when pixel 718 is for the moving object in selected image 700, enhancement module 222 identifies locations for pixel 718 in other images in sequence of images 226 using second transformations 250.

Further, enhancement module 222 uses the object mask generated for each of set of previous images 230 to determine whether to use the pixel at the location identified in each of set of previous images 230 in estimating the final value for pixel 718.

For example, when pixel 720 is for the background, enhancement module 222 determines whether the object mask corresponding to each previous image in set of previous images 230 indicates that the pixel at the location identified in the previous image is also for the background. If the pixel in the previous image is for the background, the pixel is included in the estimation of the final value for pixel 718. If the pixel in the previous image is not for the background, the pixel is not included in the estimation.

Similarly, when pixel 720 is for the moving object, enhancement module 222 determines whether the object mask corresponding to each previous image in set of previous images 230 indicates that the pixel at the location identified in the previous image is also for the moving object. If the pixel in the previous image is for the moving object, the pixel is included in the estimation of the final value for pixel 718. Otherwise, the pixel is not included.

Enhancement module 222 determines the value of the pixels included for estimation of the final value for pixel 718. The values of these pixels may be determined using an interpolation algorithm, such as, for example, without limitation, a nearest neighbor algorithm, a linear interpolation algorithm, a cubic interpolation algorithm, or some other suitable type of algorithm. Enhancement module 222 may estimate the final value for pixel 718 using weighting, averaging, outlier elimination based on distribution, other techniques, or combinations of techniques.

Figure 8:
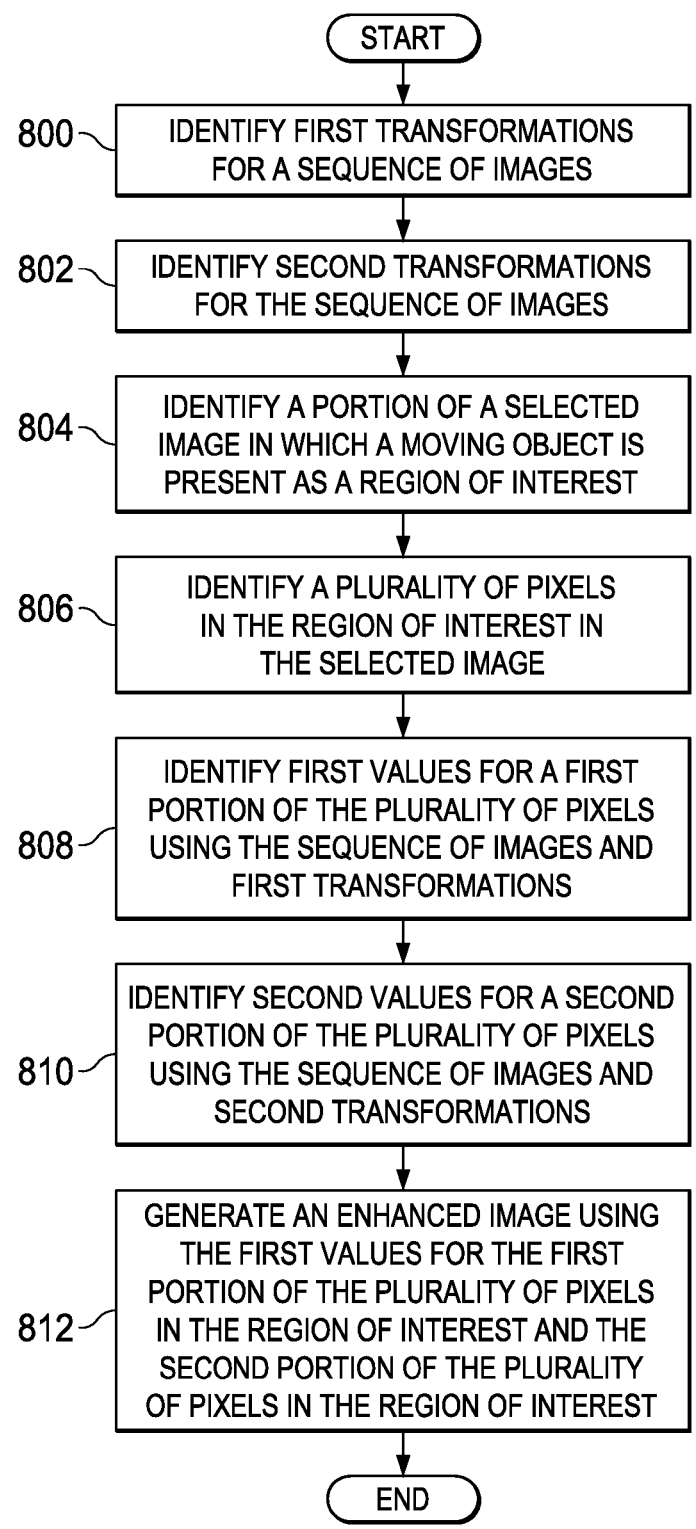
FIG. 8 is an illustration of a flowchart of a process for processing images in accordance with an advantageous embodiment.

With reference now to FIG. 8, an illustration of a flowchart of a process for processing images is depicted in accordance with an advantageous embodiment. The process illustrated in FIG. 8 may be implemented using image processing system 204 in FIG. 2. In particular, this process may be implemented using registration module 218, object tracking module 220, and enhancement module 222 in FIG. 2.

The process begins by identifying first transformations for a sequence of images (operation 800). The sequence of images may be, for example, sequence of images 226 in FIG. 2. Each of the first transformations is configured to align features of the background in one image in the sequence of images to the features of the background in the selected image.

The process then identifies second transformations for the sequence of images (operation 802). Each of the second transformations is configured to align features of the moving object in the one image in the sequence of images to the features of the moving object in the selected image.

Next, the process identifies a portion of a selected image in which a moving object is present as a region of interest (operation 804). The selected image is one of the sequence of images. In these illustrative examples, the selected image may be the most recent image in the sequence of images. Further, the moving object moves with respect to a background in the selected image.

Thereafter, the process identifies a plurality of pixels in the region of interest in the selected image (operation 806). The process identifies first values for a first portion of the plurality of pixels using the sequence of images and first transformations (operation 808). The first portion of the plurality of pixels corresponds to the background in the selected image. Next, the process identifies second values for a second portion of the plurality of pixels using the sequence of images and second transformations (operation 810). The second portion of the plurality of pixels corresponds to the moving object in the selected image.

The process then generates an enhanced image using the first values for the first portion of the plurality of pixels in the region of interest and the second portion of the plurality of pixels in the region of interest (operation 812), with the process terminating thereafter.

With reference now to FIG. 9, an illustration of a flowchart of a process for enhancing video is depicted in accordance with an advantageous embodiment. The process illustrated in FIG. 9 may be implemented using image processing system 204 in FIG. 2. In particular, this process may be implemented using registration module 218, object tracking module 220, and enhancement module 222 in FIG. 2.

The process begins by adding a current image to an image buffer for processing (operation 900). The image buffer stores a sequence of images. The current image may be one of images 206 in the form of video 212 in FIG. 2. In particular, the current image may be current image 228 in sequence of images 226 in FIG. 2.

The process then identifies a first transformation for aligning features of the background in a previous image to features of the background in the current image (operation 902). The previous image may be the image added to the image buffer prior to the current image. Next, the process updates transformations in a background transformation buffer using the first transformation (operation 904).

Thereafter, the process generates an object mask using the current image (operation 906). The object mask indicates whether one or more moving objects are detected in the current image. The process then updates a set of tracks generated for moving objects detected in the sequence of images using the current image and the object mask (operation 908). In operation 908, updating the set of tracks may include adding a new track for a newly detected moving object.

Next, the process determines whether any moving objects are detected in the current image (operation 910). If any moving objects are detected in the current image, the process identifies a second transformation for each of the moving objects (operation 912).

Each transformation is configured to align features of the corresponding moving object in the previous image in the sequence of images to features of the corresponding object in the current image. Thereafter, the process updates object transformations stored in a number of object transformation buffers using each second transformation generated for each of the moving objects (operation 914).

The process then selects a region of interest in the current image (operation 916). The process divides the region of interest into a plurality of pixels using a scaling factor (operation 918). The process then identifies first values for a first portion of the plurality of pixels corresponding to the background in the current image using the sequence of images and the transformations stored in the background transformation buffer (operation 920).

The process also identifies second values for a second portion of the plurality of pixels corresponding to one or more moving objects in the current image using the sequence of images and the object transformations stored in the object transformation buffer (operation 922).

The process then generates an enhanced image using the first values for the first portion of the plurality of pixels and the second values for the second portion of the plurality of pixels (operation 924), with the process terminating thereafter. In these illustrative examples, the enhanced image is for the region of interest and has a higher resolution as compared to the region of interest in the current image.

With reference again to operation 910, if one or more moving objects are not detected in the current image, the process proceeds to operation 916 as described above. In these illustrative examples, the process described in FIG. 9 may be repeated for each new image added to the image buffer.

Figure 10B:
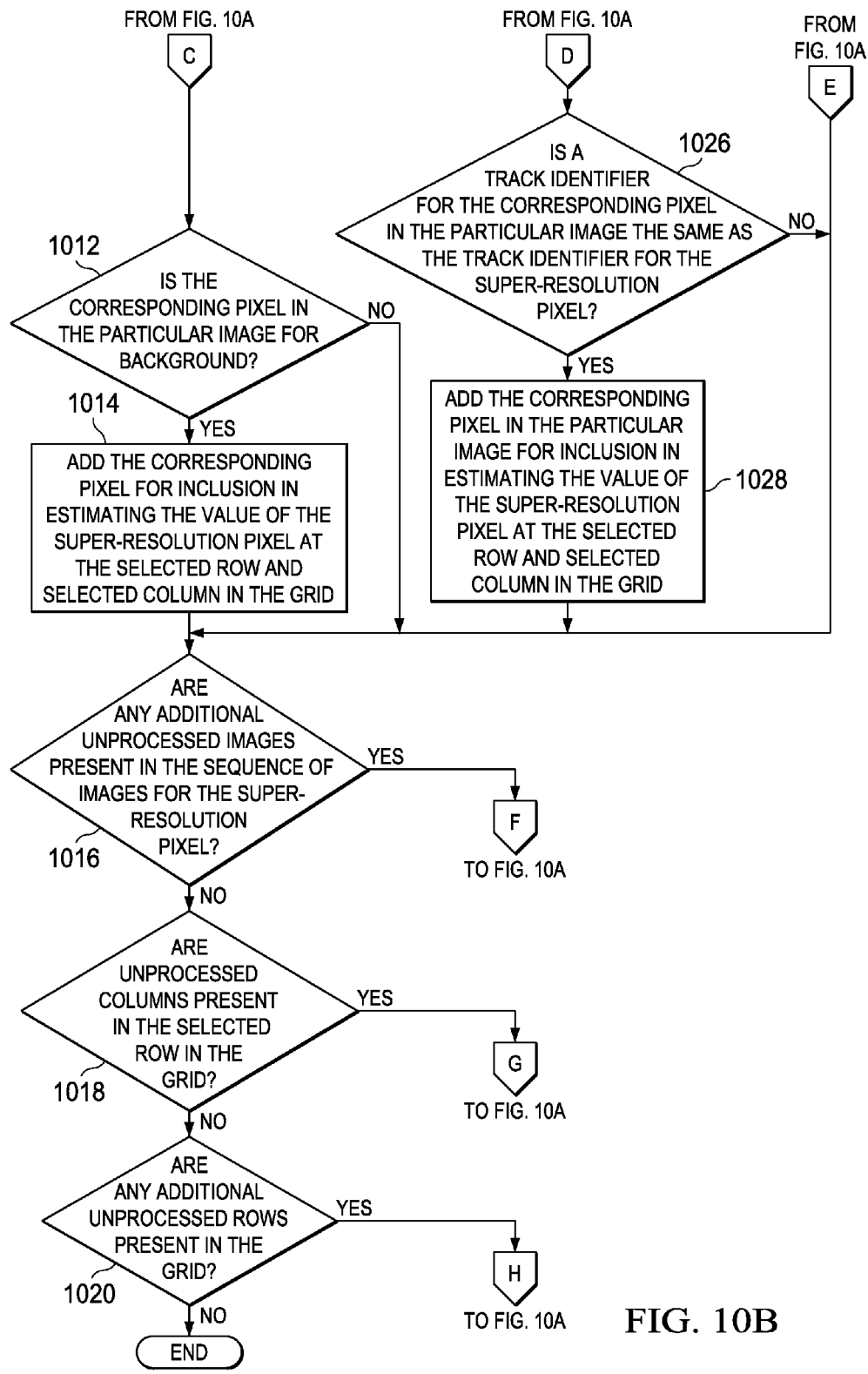

With reference now to FIGS. 10A and 10B, illustrations of a flowchart of a process for selecting pixels in a sequence of images for estimating the value of each pixel in an enhanced image of a region of interest are depicted in accordance with an advantageous embodiment. The process illustrated in FIGS. 10A and 10B may be implemented using image processing system 204 in FIG. 2.

The process begins by forming a grid for generating an enhanced image of a region of interest in a selected image in a sequence of images (operation 1000). In operation 1000, the sequence of images may be sequence of images 226 in FIG. 2, and the selected image may be selected image 256 in FIG. 2. In particular, the selected image may be current image 228 in sequence of images 226 in FIG. 2.

Further, in operation 1000, the grid includes pixels arranged in a plurality of rows and a plurality of columns. The grid is formed using a scaling factor. Grid 712 in FIG. 7 is an example of one implementation for the grid formed in operation 1000. In these illustrative examples, the pixels in the grid may be referred to as super-resolution pixels.

The process then selects a row in the grid (operation 1002). Next, the process selects a column for the selected row in the grid (operation 1004). Then, the process selects a particular image in the sequence of images (operation 1006). The particular image may be the current image in the sequence of images or an image in the set of previous images in the sequence of images.

The process determines whether the super-resolution pixel at the selected row and selected column in the grid is for background (operation 1008). In operation 1008, the process identifies the pixel in the selected image that corresponds to the super-resolution pixel at the selected row and selected column in the grid. The super-resolution pixel is for background when the corresponding pixel in the selected image is for background. Similarly, the super-resolution pixel is for a moving object when the corresponding pixel in the selected image is for the moving object.

In operation 1008, the process uses an augmented object mask corresponding to the selected image to determine whether the corresponding pixel in the selected image is for background or for a moving object. The augmented object mask has pixels that correspond to the pixels in the selected image.

A pixel in the augmented object mask indicates that the corresponding pixel in the selected image is for background when the pixel in the augmented object mask has a value of logic "0". A pixel in the augmented object mask indicates that the corresponding pixel in the selected image is not for background and is for a moving object when the value for the pixel in the augmented object mask is a track identifier. The track identifier identifies the track generated for the moving object.

When the pixel in the augmented object mask corresponding to the pixel in the selected image that corresponds to the super-resolution pixel has a value of logic "0", the super-resolution pixel is for background. When the pixel in the augmented object mask corresponding to the pixel in the selected image that corresponds to the super-resolution pixel has a value that is a track identifier for a track, the super-resolution pixel is for a moving object being tracked by that track.

With reference again to operation 1008, if the super-resolution pixel is for background, the process identifies a location of a corresponding pixel in the particular image using a first transformation (operation 1010). In operation 1010, the first transformation may be, for example, one of first transformations 232 in FIG. 2.

The process then determines whether the corresponding pixel in the particular image is for background (operation 1012). Operation 1012 may be performed using an augmented object mask corresponding to the particular image. If the corresponding pixel in the particular image is for background, the process adds the corresponding pixel for inclusion in estimating the value of the super-resolution pixel at the selected row and selected column in the grid (operation 1014).

The process then determines whether any additional unprocessed images are present in the sequence of images for the super-resolution pixel at the selected row and selected column in the grid (operation 1016). If additional unprocessed images are present, the process returns to operation 1006.

When additional unprocessed images are not present, the selection of pixels from the images in the sequence of images for inclusion in estimating the value of the super-resolution pixel at the selected row and selected column in the grid is complete. The values for the pixels selected may then be used to estimate the value of the super-resolution pixel.

With reference again to operation 1016, if additional unprocessed images are not present in the sequence of images, the process determines whether unprocessed columns are present in the selected row in the grid (operation 1018). If unprocessed columns are present, the process returns to operation 1004 as described above. Otherwise, the process determines whether any additional unprocessed rows are present in the grid (operation 1020). If unprocessed rows are present, the process returns to operation 1002 as described above. Otherwise, the process terminates.

With reference again to operation 1012, if the corresponding pixel in the particular image is not for background, the process then proceeds to operation 1016 as described above. Further, with reference again to operation 1008, if the super-resolution pixel at the selected row and selected column in the grid is not for background, then the super-resolution pixel is for a moving object having a particular track identifier identified in the augmented object mask corresponding to the selected image.

In operation 1008, if the super-resolution pixel is not for background, the process identifies a location of a corresponding pixel in the particular image using a second transformation (operation 1022). The second transformation may be, for example, one of second transformations 250 in FIG. 2.

The process then determines whether the corresponding pixel in the particular image is for a moving object (operation 1024). If the corresponding pixel in the particular image is for a moving object, the process determines whether a track identifier for the corresponding pixel in the particular image is the same as the track identifier for the super-resolution pixel (operation 1026).

In operation 1026, the track identifier for the corresponding pixel in the particular image is the value of the pixel in the augmented object mask for the particular image that corresponds to the corresponding pixel in the particular image. In operation 1026, if the track identifiers are the same, the process adds the corresponding pixel in the particular image for inclusion in estimating the value of the super-resolution pixel at the selected row and selected column in the grid (operation 1028).

The process then proceeds to operation 1016 as described above. With reference again to operation 1026, if the track identifiers are not the same, the process proceeds directly to operation 1016 as described above. Further, with reference again to operation 1024, if the corresponding pixel in the particular image is not for a moving object, the process also proceeds directly to operation 1016 as described above.

The flowcharts and block diagrams in the different depicted embodiments illustrate the architecture, functionality, and operation of some possible implementations of apparatuses and methods in an advantageous embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the block may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, in some illustrative examples, the process illustrated in FIGS. 10A and 10B may be modified such that super-resolution is performed only for the background and not for moving objects. In this case, when the super-resolution pixel at the selected row and selected column in the grid is for a moving object, the value for the super-resolution pixel becomes the value of the corresponding pixel in the selected image.

In other words, the process illustrated in FIGS. 10A and 10B may be modified such that, with reference to operation 1008, if the super-resolution pixel at the selected row and selected column in the grid is not for background, the process includes the corresponding pixel in the selected image for inclusion in estimating the value of the super-resolution pixel but excludes the corresponding pixels in the other images in the sequence of images. This operation may be performed in place of operations 1022, 1024, 1026, and 1028 in FIGS. 10A and 10B.

These modifications to the process illustrated in FIGS. 10A and 10B may be performed in response to a number of different types of situations. For example, when a moving object is not detected in more than a selected number of images in the sequence of images, these modifications may be made to the process illustrated in FIGS. 10A and 10B. The moving object may not be detected in images in the sequence of images in response to the moving object being blocked by some other object. Further, these modifications may be made when the information generated by object tracking module 220 in FIG. 2 is considered unreliable or unavailable.

Turning now to FIG. 11, an illustration of a data processing system is depicted in accordance with an advantageous embodiment. In this illustrative example, data processing system 1100 may be used to implement one or more computers in computer system 216 in FIG. 2. Data processing system 1100 includes communications fabric 1102, which provides communications between processor unit 1104, memory 1106, persistent storage 1108, communications unit 1110, input/output (I/O) unit 1112, and display 1114.

Processor unit 1104 serves to execute instructions for software that may be loaded into memory 1106. Processor unit 1104 may be a number of processors, a multi-processor core, or some other type of processor, depending on the particular implementation. A number, as used herein with reference to an item, means one or more items. Further, processor unit 1104 may be implemented using a number of heterogeneous processor systems in which a main processor is present with secondary processors on a single chip. As another illustrative example, processor unit 1104 may be a symmetric multi-processor system containing multiple processors of the same type.

Memory 1106 and persistent storage 1108 are examples of storage devices 1116. A storage device is any piece of hardware that is capable of storing information, such as, for example, without limitation, data, program code in functional form, other suitable information, or combinations of information, either on a temporary basis, a permanent basis, or both. Storage devices 1116 may also be referred to as computer readable storage devices in these examples. Memory 1106, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these examples, provides for communications with other data processing systems or devices. In these examples, communications unit 1110 is a network interface card. Communications unit 1110 may provide communications through the use of either or both physical and wireless communications links.

Input/output unit 1112 allows for input and output of data with other devices that may be connected to data processing system 1100. For example, input/output unit 1112 may provide a connection for user input through a keyboard, a mouse, some other suitable input device, or a combination of devices. Further, input/output unit 1112 may send output to a printer. Display 1114 provides a mechanism to display information to a user.

Instructions for the operating system, applications, programs, either alone or in any combination, may be located in storage devices 1116, which are in communication with processor unit 1104 through communications fabric 1102. In these illustrative examples, the instructions are in a functional form on persistent storage 1108. These instructions may be loaded into memory 1106 for execution by processor unit 1104. The processes of the different embodiments may be performed by processor unit 1104 using computer-implemented instructions, which may be located in a memory, such as memory 1106.

These instructions are referred to as program code, computer usable program code, or computer readable program code that may be read and executed by a processor in processor unit 1104. The program code in the different embodiments may be embodied on different physical or computer readable storage media, such as memory 1106 or persistent storage 1108.

Program code 1118 is located in a functional form on computer readable media 1120 that is selectively removable and may be loaded onto or transferred to data processing system 1100 for execution by processor unit 1104. Program code 1118 and computer readable media 1120 form computer program product 1122 in these examples. In one example, computer readable media 1120 may be computer readable storage media 1124 or computer readable signal media 1126. Computer readable storage media 1124 may include, for example, an optical or magnetic disk that is inserted or placed into a drive or other device that is part of persistent storage 1108 for transfer onto a storage device, such as a hard drive, that is part of persistent storage 1108.

Computer readable storage media 1124 also may take the form of a persistent storage, such as a hard drive, a thumb drive, or a flash memory, that is connected to data processing system 1100. In some instances, computer readable storage media 1124 may not be removable from data processing system 1100. In these examples, computer readable storage media 1124 is a physical or tangible storage device used to store program code 1118 rather than a medium that propagates or transmits program code 1118. Computer readable storage media 1124 is also referred to as a computer readable tangible storage device or a computer readable physical storage device. In other words, computer readable storage media 1124 is a media that can be touched by a person.

Alternatively, program code 1118 may be transferred to data processing system 1100 using computer readable signal media 1126. Computer readable signal media 1126 may be, for example, a propagated data signal containing program code 1118. For example, computer readable signal media 1126 may be an electromagnetic signal, an optical signal, any other suitable type of signal, or a combination of signals. These signals may be transmitted over communications links, such as wireless communications links, optical fiber cable, coaxial cable, a wire, any other suitable type of communications link, or combinations of links. In other words, the communications link may be physical or wireless in the illustrative examples.

In some advantageous embodiments, program code 1118 may be downloaded over a network to persistent storage 1108 from another device or data processing system through computer readable signal media 1126 for use within data processing system 1100. For instance, program code stored in a computer readable storage medium in a server data processing system may be downloaded over a network from the server to data processing system 1100. The data processing system providing program code 1118 may be a server computer, a client computer, or some other device capable of storing and transmitting program code 1118.

The different components illustrated for data processing system 1100 are not meant to provide architectural limitations to the manner in which different embodiments may be implemented. The different advantageous embodiments may be implemented in a data processing system including components in addition to or in place of those illustrated for data processing system 1100. Other components shown in FIG. 11 can be varied from the illustrative examples shown. The different embodiments may be implemented using any hardware device or system capable of running program code. As one example, the data processing system may include organic components integrated with inorganic components or may be comprised entirely of organic components excluding a human being. For example, a storage device may be comprised of an organic semiconductor.

In another illustrative example, processor unit 1104 may take the form of a hardware unit that has circuits that are manufactured or configured for a particular use. This type of hardware may perform operations without needing program code to be loaded into a memory from a storage device to be configured to perform the operations.

For example, when processor unit 1104 takes the form of a hardware unit, processor unit 1104 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1118 may be omitted, because the processes for the different embodiments are implemented in a hardware unit.

In still another illustrative example, processor unit 1104 may be implemented using a combination of processors found in computers and hardware units. Processor unit 1104 may have a number of hardware units and a number of processors that are configured to run program code 1118. With this depicted example, some of the processes may be implemented in the number of hardware units, while other processes may be implemented in the number of processors.

In another example, a bus system may be used to implement communications fabric 1102 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 1106, or a cache, such as found in an interface and memory controller hub that may be present in communications fabric 1102.

Thus, the different advantageous embodiments provide a method and apparatus for enhancing video using super-resolution. In particular, the different advantageous embodiments provide a method and apparatus that enhances video of a scene in which objects move relative to a background of the scene using super-resolution techniques.

In one advantageous embodiment, a method for processing images is provided. A portion of a selected image in which a moving object is present is identified. The selected image is one of a sequence of images. The moving object moves with respect to a background in the selected image. A plurality of pixels in a region of interest is identified in the selected image. First values are identified for a first portion of the plurality of pixels using the sequence of images and first transformations. The first portion of the plurality of pixels corresponds to the background in the selected image. A first transformation in the first transformations is configured to align features of the background in one image in the sequence of images to the features of the background in the selected image. Second values are identified for a second portion of the plurality of pixels using the sequence of images and second transformations. The second portion of the plurality of pixels corresponds to the moving object in the selected image. A second transformation in the second transformations is configured to align features of the moving object in the one image in the sequence of images to the features of the moving object in the selected image.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for processing images, the method comprising:
    identifying a portion of a selected image in which a moving object is present, wherein the selected image is one of a sequence of images and the moving object moves with respect to a background in the selected image;
    identifying a plurality of pixels in a region of interest in the selected image;
    selecting a pixel in the plurality of pixels in the region of interest in the selected image;
    determining whether the pixel in the plurality of pixels in the region of interest corresponds to the background in the selected image;
    determining whether the pixel in the plurality of pixels in the region of interest corresponds to the moving object in the selected image;
    identifying first values for a first portion of the plurality of pixels using the sequence of images and first transformations, wherein the first portion of the plurality of pixels corresponds to the background in the selected image and wherein a first transformation in the first transformations is configured to align features of the background in one image in the sequence of images to the features of the background in the selected image, wherein the selected image is generated from a position at a different distance from a scene as compared to the one image and wherein the selected image is generated and sent from a mobile platform in substantially real-time and received in substantially real-time;

identifying second values for a second portion of the plurality of pixels using the sequence of images and second transformations, wherein the second portion of the plurality of pixels corresponds to the moving object in the selected image and wherein a second transformation in the second transformations is configured to align features of the moving object in the one image in the sequence of images to the features of the moving object in the selected image; and wherein identifying the second values for the second portion of the plurality of pixels using the sequence of images and the second transformations comprises:
identifying locations for the pixel in other images in the sequence of images using the second transformations when the pixel corresponds to the moving object in the selected image;
identifying values for the pixel using the locations and an algorithm selected from the group consisting of a nearest neighbor algorithm, a linear interpolation algorithm, and a cubic interpolation algorithm; and
estimating a final value for the pixel in the plurality of pixels in the region of interest using the values identified for the pixel and at least one technique selected from the group consisting of weighing, averaging, and outlier elimination based on distribution.

2. The method of claim 1 further comprising:
dividing the region of interest into a plurality of pixels using a scaling factor, wherein the scaling factor determines how many pixels in the plurality of pixels of an enhanced image correspond to a single pixel in the selected image; and
generating the enhanced image using the first values for the first portion of the plurality of pixels in the region of interest and the second portion of the plurality of pixels in the region of interest, wherein the enhanced image has a higher resolution as compared to the selected image.

3. The method of claim 2, wherein the scaling factor is at least 3 and results in at least 3×3 pixels in the plurality of pixels of the enhanced image corresponding to the single pixel in the selected image.

4. The method of claim 1 wherein:
the mobile platform is an aircraft; and
identifying the first values for the first portion of the plurality of pixels using the sequence of images and the first transformations comprises:
identifying locations for the pixel selected from the plurality of pixels in other images in the sequence of images using the first transformations when the pixel corresponds to the background in the selected image;
identifying values for the pixel using the locations;
estimating a final value for the pixel in the plurality of pixels in the region of interest using the values identified for the pixel; and
repeating the steps of identifying the locations for the pixel selected from the plurality of pixels in the other images in the sequence of images using the first transformations when the pixel corresponds to the background in the selected image; identifying the values for the pixel using the locations; and estimating the final value for the pixel in the plurality of pixels in the region of interest using the values identified for the pixel for each pixel selected from the plurality of pixels in the region of interest that corresponds to the background in the selected image.

5. The method of claim 1 wherein:
the one image is of a variation of the scene and is generated, sent, and received from a stationary platform in substantially real-time; and
identifying the second values for the second portion of the plurality of pixels using the sequence of images and the second transformations comprises:
identifying locations for the pixel in other images in the sequence of images using the second transformations when the pixel corresponds to the moving object in the selected image;
identifying values for the pixel using the locations;
estimating a final value for the pixel in the plurality of pixels in the region of interest using the values identified for the pixel; and
repeating the steps of identifying the locations for the pixel in the other images in the sequence of images; identifying the values for the pixel at the locations using the second transformations; and estimating the final value for the pixel in the plurality of pixels in the region of interest using the values identified for the pixel for each pixel selected from the plurality of pixels in the region of interest that corresponds to the moving object in the selected image.

6. The method of claim 1, wherein:
the first transformations and the second transformations are transformations selected from a group consisting of an affine transformation, a homographic transformation, and a linear transformation;
the selected image is of a first variation of the scene and the one image is of a second variation of the scene, wherein the first variation and the second variation are different; and
the moving object in the selected image comprises at least one of people, an animal, and an aircraft.

7. The method of claim 1, wherein the mobile platform is selected from the group consisting of an aircraft, a train, a surface ship, a tank, a personnel carrier, a spacecraft, a space station, a satellite, a submarine, an automobile, and an unmanned aerial vehicle; wherein the selected image is of a first variation of the scene; and wherein the selected image is generated from the mobile platform.

8. The method of claim 1 further comprising:
generating object masks by an object tracking module for the sequence of images, wherein each object mask in the object masks corresponds to an image in the sequence of images and wherein each pixel in an object mask in the object masks has a value indicating that the each pixel corresponds to one of the background in the image and the moving object in the image;
detecting and tracking by the object tracking module the moving object in the scene in the sequence of images, wherein detecting the moving object uses at least one of an object segmentation algorithm, a mean-shift tracking algorithm, and a Lucas-Kanade method;
identifying the second transformations using the object masks, the sequence of images, and a track for the moving object generated for one or more of the sequence of images; and wherein generating the object masks for the sequence of images further comprises:
  generating an object mask in the object masks for a corresponding image in the sequence of images; and
  assigning a pixel in the object mask the value, wherein the value is selected from one of a first value and a second value, wherein the first value is a logic "0" and the second value is selected from one of a logic "1" and a track identifier.

9. The method of claim 8, further comprising:
storing the sequence of images in an image buffer;
storing the first transformations in a background transformation buffer;
storing the object masks in an object mask buffer; and
storing the second transformations in an object transformation buffer.

10. The method of claim 9 further comprising:
storing the images in the sequence of images in the image buffer as the images are generated, wherein the images are generated by an imaging system associated with the mobile platform.

11. A method for enhancing an image comprising:
identifying a portion of a selected image in which a moving object is present, wherein the selected image is one of a sequence of images and the moving object moves with respect to a background in the selected image;
identifying a plurality of pixels in a region of interest in the selected image;
selecting a pixel in the plurality of pixels in the region of interest in the selected image;
determining whether the pixel in the plurality of pixels in the region of interest corresponds to the background in the selected image;
determining whether the pixel in the plurality of pixels in the region of interest corresponds to the moving object in the selected image;
identifying first values for a first portion of the plurality of pixels using the sequence of images and first transformations, wherein the first portion of the plurality of pixels corresponds to the background in the selected image and wherein a first transformation in the first transformations is configured to align features of the background in one image in the sequence of images to the features of the background in the selected image;
identifying second values for a second portion of the plurality of pixels using the selected image, wherein the second portion of the plurality of pixels corresponds to the moving object in the selected image, wherein the selected image is generated from a position at a different distance from a scene as compared to the one image and wherein the selected image is generated and sent from a mobile platform in substantially real-time and received in substantially real-time; and
wherein identifying the second values for the second portion of the plurality of pixels using the selected image comprises identifying the second values for the second portion of the plurality of pixels using the sequence of images and second transformations, which in turn comprises:
  identifying locations for the pixel in other images in the sequence of images using the second transformations when the pixel corresponds to the moving object in the selected image;
  identifying values for the pixel using the locations and an algorithm selected from the group consisting of a nearest neighbor algorithm, a linear interpolation algorithm, and a cubic interpolation algorithm; and
  estimating a final value for the pixel in the plurality of pixels in the region of interest using the values identified for the pixel and at least one technique selected from the group consisting of weighing, averaging, and outlier elimination based on distribution.

12. The method of claim 11 further comprising:
determining whether the moving object is detected in a selected number of images in the sequence of images;
dividing each pixel in the region of interest into a plurality of pixels using a scaling factor, wherein the scaling factor determines how many pixels in the plurality of pixels of an enhanced image correspond to a single pixel in the selected image, and wherein the scaling factor is at least 3 and results in at least 3×3 pixels in the plurality of pixels of the enhanced image corresponding to the single pixel in the selected image; and
wherein:
  the mobile platform is an unmanned aerial vehicle;
  the selected image is generated and sent in substantially real-time from the unmanned aerial vehicle;
  the selected image is of a first variation of the scene and the one image is of a second variation of the scene;
  the first variation and second variation are different;
  the moving object in the selected image comprises at least one of people, an animal, and an aircraft; and
  identifying the second values for the second portion of the plurality of pixels using the selected image comprises identifying the second values for the second portion of the plurality of pixels using the sequence of images and second transformations when the moving object is detected in the selected number of images in the sequence of images, wherein the second portion of the plurality of pixels corresponds to the moving object in the selected image, and wherein a second transformation in the second transformations is configured to align features of the moving object in the one image in the sequence of images to the features of the moving object in the selected image.

13. An apparatus comprising:
an object tracking module configured to identify a portion of a selected image in which a moving object is present, wherein the selected image is one of a sequence of images and the moving object moves with respect to a background in the selected image;
an enhancement module configured to:
  identify a plurality of pixels in a region of interest in the selected image;
  select a pixel in the plurality of pixels in the region of interest in the selected image;
  determine whether the pixel in the plurality of pixels in the region of interest corresponds to the background in the selected image;
  determine whether the pixel in the plurality of pixels in the region of interest corresponds to the moving object in the selected image;
  identify first values for a first portion of the plurality of pixels using the sequence of images and first transformations,
  wherein:
    the first portion of the plurality of pixels corresponds to the background in the selected image,
    a first transformation in the first transformations is configured to align features of the background in one image in the sequence of images to the features of the background in the selected image, the selected image is generated from a position at a different distance from a scene as compared to the one image, and the selected image is generated and sent from a mobile platform in substantially real-time and received in substantially real-time; and identify second values for a second portion of the plurality of pixels using the sequence of images and second transformations, wherein:

the second portion of the plurality of pixels corresponds to the moving object in the selected image, and a second transformation in the second transformations is configured to align features of the moving object in the one image in the sequence of images to the features of the moving object in the selected image; and wherein in being configured to identify the second values for the second portion of the plurality of pixels using the sequence of images and the second transformations, the enhancement module is configured to:

identify locations for the pixel in other images in the sequence of images using the second transformations when the pixel corresponds to the moving object in the selected image;

identify values for the pixel using the locations and an algorithm selected from the group consisting of a nearest neighbor algorithm, a linear interpolation algorithm, and a cubic interpolation algorithm; and estimate a final value for the pixel in the plurality of pixels in the region of interest using the values identified for the pixel and at least one technique selected from the group consisting of weighting, averaging, and outlier elimination based on distribution.

14. The apparatus of claim 13, wherein the enhancement module is further configured to divide each pixel in the region of interest into a plurality of pixels using a scaling factor, wherein the scaling factor determines how many pixels in the plurality of pixels of an enhanced image correspond to a single pixel in the selected image; and to generate the enhanced image using the first values for the first portion of the plurality of pixels in the region of interest and the second portion of the plurality of pixels in the region of interest, wherein the enhanced image has a higher resolution as compared to the selected image.

15. The apparatus of claim 14, wherein the scaling factor is at least 3 and results in at least 3×3 pixels in the plurality of pixels of the enhanced image corresponding to the single pixel in the selected image.

16. The apparatus of claim 13, wherein:

in being configured to identify the first values for the first portion of the plurality of pixels using the sequence of images and the first transformations, the enhancement module is configured to identify locations for the pixel selected from the plurality of pixels in other images in the sequence of images using the first transformations when the pixel corresponds to the background in the selected image; to identify values for the pixel using the locations and an algorithm selected from the group consisting of a nearest neighbor algorithm, a linear interpolation algorithm, and a cubic interpolation algorithm; and to estimate a final value for the pixel in the plurality of pixels in the region of interest using the values identified for the pixel and at least one technique selected from the group consisting of weighting, averaging, and outlier elimination based on distribution.

17. The apparatus of claim 13, wherein the mobile platform is selected from the group consisting of an aircraft, a train, a surface ship, a tank, a personnel carrier, a spacecraft, a space station, a satellite, a submarine, an automobile, and an unmanned aerial vehicle; wherein the selected image is of a first variation of the scene.

18. The apparatus of claim 13 further comprising:

an imaging system configured to generate images in the sequence of images, wherein the imaging system is connected to the mobile platform, wherein the mobile platform is selected from the group consisting of a spacecraft, a space station, a satellite, and a submarine;

an image buffer configured to store the sequence of images;

a background transformation buffer configured to store the first transformations;

an object transformation buffer configured to store the second transformations; and wherein:

the selected image is of a first variation of the scene and the one image is of a second variation of the scene, wherein the first variation and second variation are different; and the moving object in the selected image comprises at least one of people, an animal, and an aircraft.

19. The apparatus of claim 13, wherein the object tracking module is further configured to generate object masks for the sequence of images and to detect and track the moving object in the scene in the sequence of images with at least one of an object segmentation algorithm, a mean-shift tracking algorithm, and a Lucas-Kanade method, wherein each object mask in the object masks corresponds to an image in the sequence of images, wherein each pixel in an object mask in the object masks has a value indicating that the each pixel in the object mask corresponds to one of the background in the image and the moving object in the image, and wherein the mobile platform is selected from the group consisting of a train, a surface ship, a tank, a submarine, and an automobile, and wherein the selected image is of a first variation of the scene.

* * * * *